US012799797B2

(12) United States Patent
Yukawa

(10) Patent No.: US 12,799,797 B2
(45) Date of Patent: Nov. 17, 2026

(54) DIAGNOSTIC APPARATUS, DIAGNOSTIC SYSTEM, AND DIAGNOSTIC METHOD

(71) Applicant: FUJI ELECTRIC CO., LTD., Kanagawa (JP)

(72) Inventor: Shinji Yukawa, Mie (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 407 days.

(21) Appl. No.: 18/492,041

(22) Filed: Oct. 23, 2023

(65) Prior Publication Data

US 2024/0218726 A1 Jul. 4, 2024

(30) Foreign Application Priority Data

Dec. 28, 2022 (JP) ................................ 2022-212720

(51) Int. Cl.
*E05F 15/659* (2015.01)
*E05F 15/635* (2015.01)

(52) U.S. Cl.
CPC .......... *E05F 15/659* (2015.01); *E05F 15/635* (2015.01); *E05Y 2400/36* (2013.01); *E05Y 2400/514* (2013.01); *E05Y 2900/51* (2013.01)

(58) Field of Classification Search
CPC .. E05F 15/635; E05F 15/659; E05Y 2400/36; E05Y 2400/514; E05Y 2900/51
See application file for complete search history.

(56) References Cited

U.S. PATENT DOCUMENTS

| | | | | |
|---|---|---|---|---|
| 3,745,705 A * | 7/1973 | Reddy | E05F 15/41 | 49/362 |
| 4,017,044 A * | 4/1977 | Anderson | B61L 3/221 | 246/187 B |
| 4,384,250 A * | 5/1983 | Darrow | B60K 31/042 | 324/161 |
| 4,491,917 A * | 1/1985 | Higgins | E05F 15/40 | 180/286 |
| 5,410,149 A * | 4/1995 | Winston, Jr. | B66B 13/26 | 250/221 |
| 7,206,676 B2 * | 4/2007 | Cross | B61L 17/00 | 701/19 |

(Continued)

FOREIGN PATENT DOCUMENTS

| | | |
|---|---|---|
| JP | H08-85689 | 4/1996 |
| JP | 2012-240470 | 12/2012 |

(Continued)

OTHER PUBLICATIONS

Office Action mailed on Mar. 13, 2025 issued with respect to the corresponding Canadian Patent Application No. 3,217,722.

(Continued)

*Primary Examiner* — Tyler J Lee
(74) *Attorney, Agent, or Firm* — IPUSA, PLLC

(57) ABSTRACT

A diagnostic apparatus acquires data for a motor that drives a door in a train carriage, in at least one of a case where the door is opened at a second speed lower than a first speed at which a passenger is to get on and off the train carriage, or a case where the door is closed at the second speed, the data relating to the driving of the door. The diagnostic apparatus diagnoses an abnormality in a traveling resistance of the door, based on the acquired data.

14 Claims, 16 Drawing Sheets

(56) References Cited

U.S. PATENT DOCUMENTS

| | | | | |
|---|---|---|---|---|
| 8,115,162 | B2 * | 2/2012 | Shikai | B66B 13/26 250/221 |
| 8,584,809 | B2 * | 11/2013 | Sun | B66B 13/26 187/316 |
| 2003/0168288 | A1 * | 9/2003 | Deplazes | B66B 13/26 187/317 |
| 2004/0068361 | A1 * | 4/2004 | Cross | B61L 27/40 701/117 |
| 2008/0224642 | A1 | 9/2008 | Rodriguez et al. | |
| 2009/0108987 | A1 * | 4/2009 | Shikai | B66B 13/26 340/3.1 |
| 2023/0035170 | A1 | 2/2023 | Kondo et al. | |

FOREIGN PATENT DOCUMENTS

| | | |
|---|---|---|
| JP | 2020-082993 | 6/2020 |
| JP | 2021-130378 | 9/2021 |
| JP | 2022-127839 | 9/2022 |

OTHER PUBLICATIONS

Office Action mailed on Sep. 1, 2026 issued with respect to the corresponding Japanese Patent Application No. 2022-212720.

* cited by examiner

DIAGNOSTIC APPARATUS, DIAGNOSTIC SYSTEM, AND DIAGNOSTIC METHOD

CROSS-REFERENCE TO RELATED APPLICATION

This application claims priority to Japanese Patent Application No. 2022-212720, filed on Dec. 28, 2022, the entire contents of which are incorporated herein by reference.

BACKGROUND

1. Field of the Invention

The present disclosure relates to a diagnostic apparatus and the like.

2. Description of the Related Art

There are known techniques that diagnose anomalies in operational resistance (hereinafter referred to as "traveling resistance") of a door of a train carriage while the door is opened or closed (see Patent Document 1).

Patent Document 1 discloses a method for diagnosing an abnormality (e.g., increased operational resistance of the door that moves along a slide rail) in the traveling resistance of the door, by using a measured magnitude of a motor current that flows during a time period in which the door moves at a constant speed.

RELATED-ART DOCUMENT

Patent Document

[Patent Document 1] Japanese Unexamined Patent Application Publication No. 2020-82993

SUMMARY

In a first aspect of the present disclosure, a diagnostic apparatus is provided. The diagnostic apparatus includes circuitry configured to: acquire data for a motor configured to drive a door in a train carriage, in at least one of a case where the door is opened at a second speed lower than a first speed at which a passenger is to get on and off the train carriage, or a case where the door is closed at the second speed, the data being related to the driving of the door, and diagnose an abnormality in a traveling resistance of the door, based on the acquired data.

In a second aspect of the present disclosure, a diagnostic system is provided. The diagnostic system includes circuitry configured to: perform at least one of opening or closing a door of a train carriage, at a second speed that is lower than a first speed at which a passenger is to get on and off the train carriage, acquire data for a motor that drives a door in a train carriage, in at least one of a case where the door is opened at the second speed, or a case where the door is closed at the second speed, the data being related to the driving of the door, and diagnose an abnormality in a traveling resistance of the door, based on the acquired data.

In a third aspect of the present disclosure, a diagnostic method executed by an information processing apparatus is provided. The diagnostic method includes: acquiring data for a motor that drives a door in a train carriage, in at least one of a case where the door is opened at a second speed lower than a first speed at which a passenger is to get on and off the train carriage, or a case where the door is closed at the second speed, the data being related to the driving of the door, and diagnosing an abnormality in a traveling resistance of the door, based on the acquired data.

In a fourth aspect of the present disclosure, a non-non-transitory computer readable medium storing a program for causing a computer to execute the diagnostic method of the third aspect is provided.

DETAILED DESCRIPTION

Related art information relevant to the present disclosure recognized by the inventor of this application is provided below. In the method described in Patent Document 1, the abnormality in the traveling resistance of the door can be diagnosed at any position at which the door is opened or closed within a steady state period (a constant speed period). However, the abnormality cannot be diagnosed at any position at which the door is opened and closed within a transient state period. For this reason, for example, there may be cases where the abnormality in the traveling resistance of the door cannot be diagnosed at any location that is relatively close to a fully opened position or a fully closed position of the door.

Therefore, in view of the above issue recognized by the inventor, an object of the present disclosure is to provide a technique capable of more appropriately diagnosing an abnormality in a traveling resistance of a door.

Hereinafter, one or more embodiments will be described with reference to the drawings.

Configuration Associated With Opening and Closing of Door

An example of the configuration associated with opening and closing of a door 80 in a train carriage 1 will be described below with reference to FIGS. 1 to 6.

Figure 1:
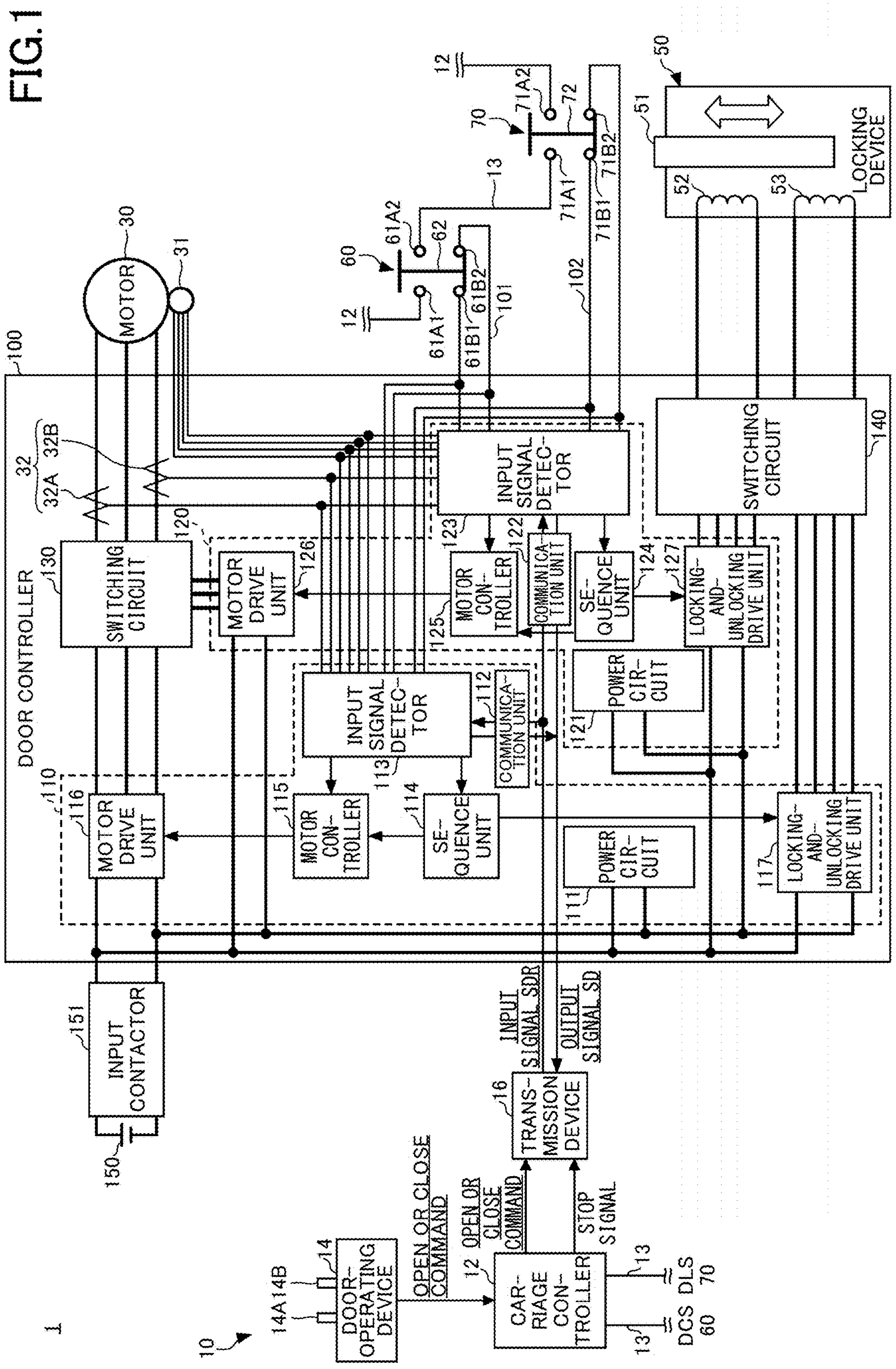
FIG. 1 is a block diagram illustrating a configuration example associated with an opening-and-closing operation of a door of a train carriage.
Figure 2:
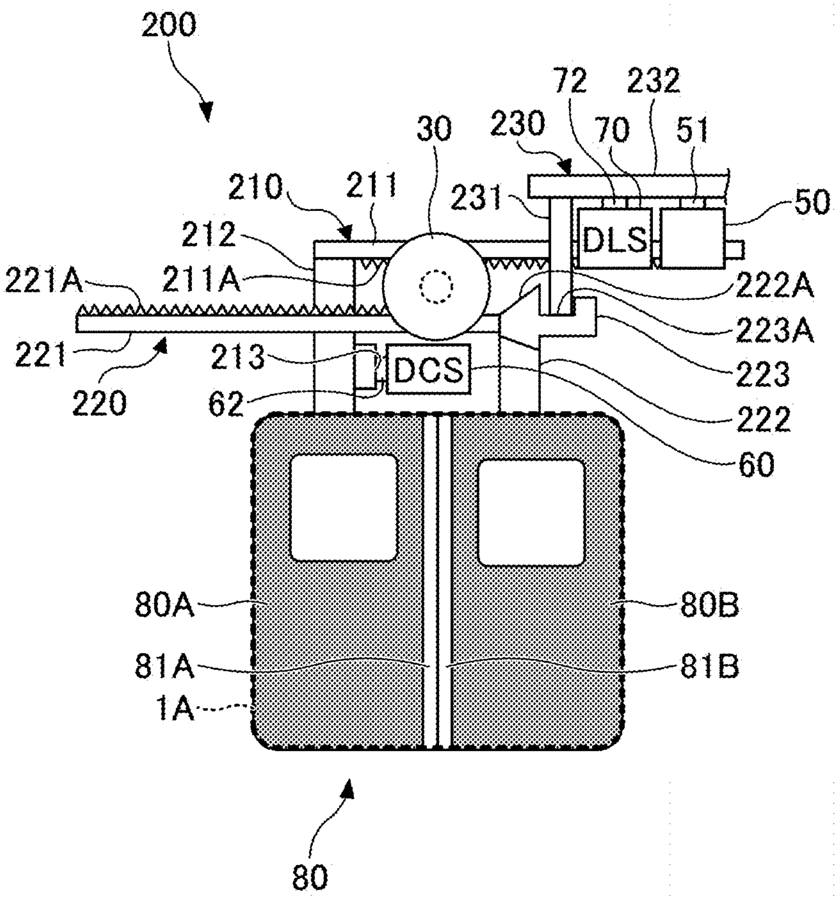
FIG. 2 is a schematic diagram illustrating an example of an arrangement structure of the door and the door drive mechanism of the train carriage.
Figure 3:
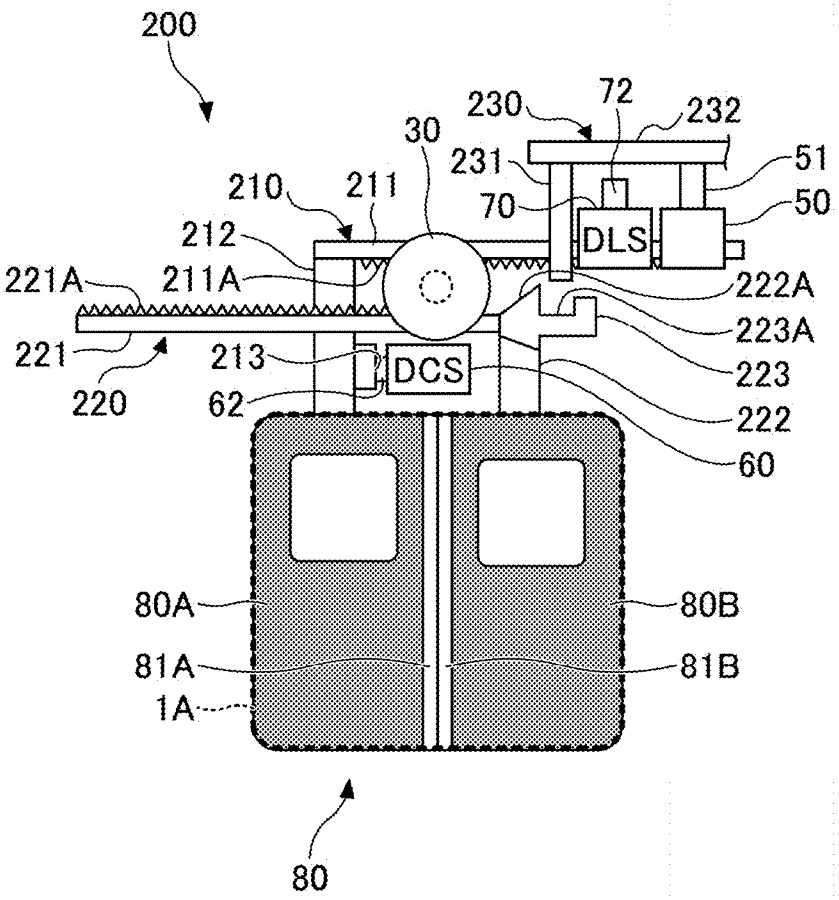
FIG. 3 is a schematic diagram illustrating an example of the arrangement structure of the door and the door drive mechanism of the train carriage.
Figure 4:
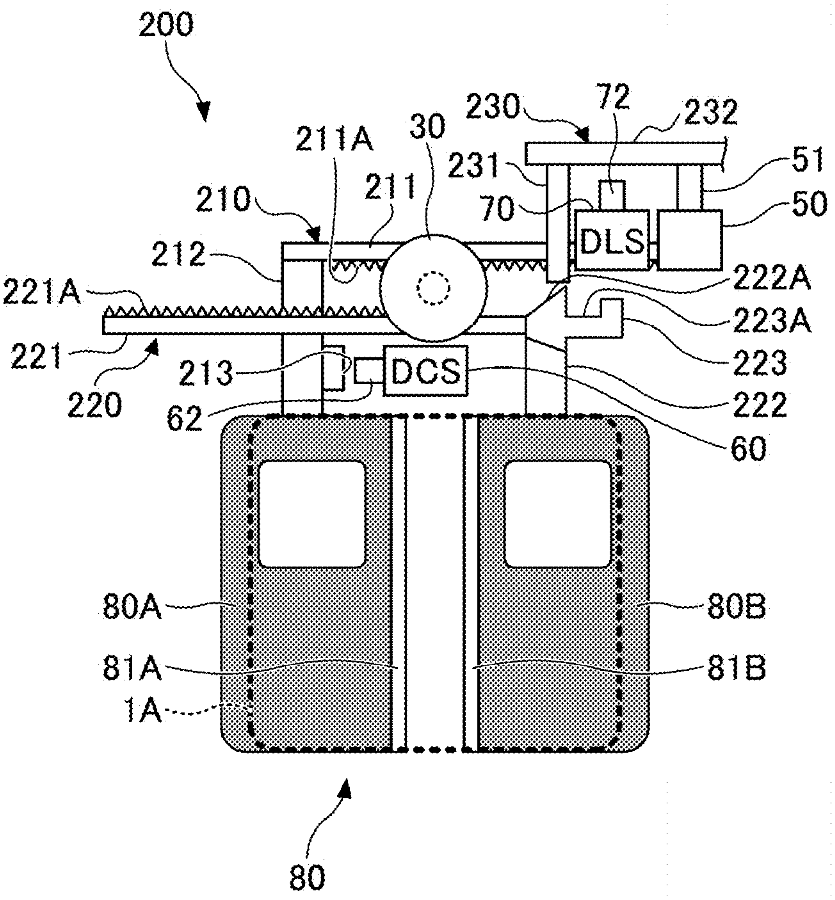
FIG. 4 is a schematic diagram illustrating an example of the arrangement structure of the door and the door drive mechanism of the train carriage.
Figure 5:
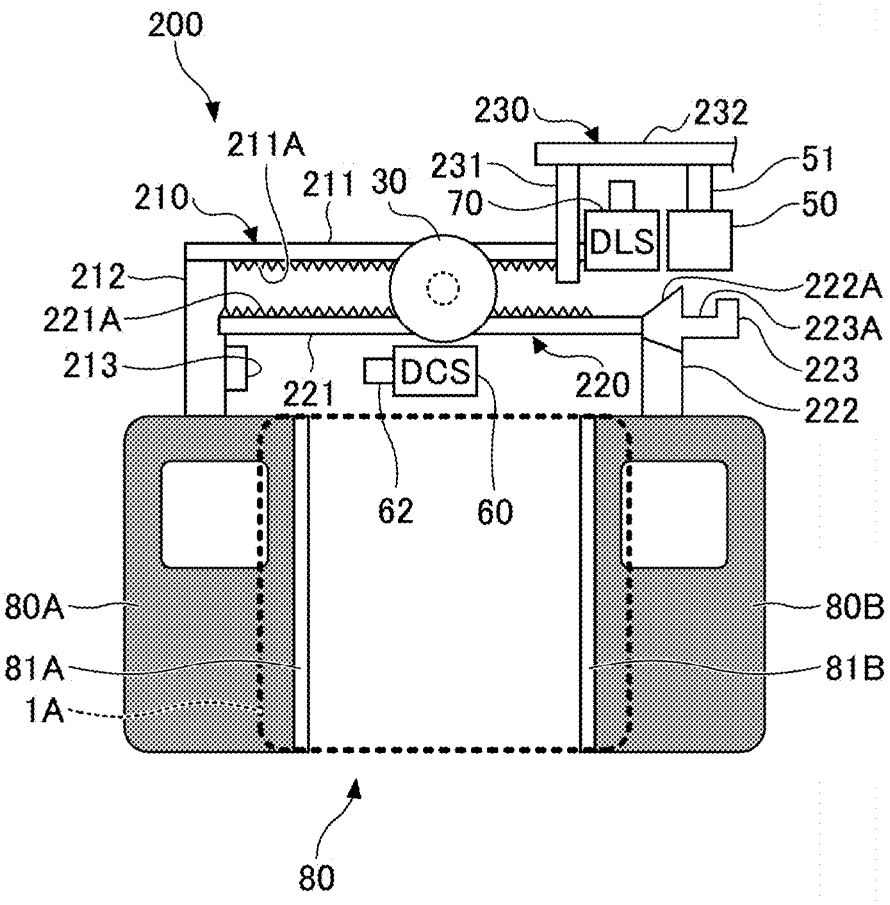
FIG. 5 is a schematic diagram illustrating an example of the arrangement structure of the door and the door drive mechanism of the train carriage.
Figure 6:
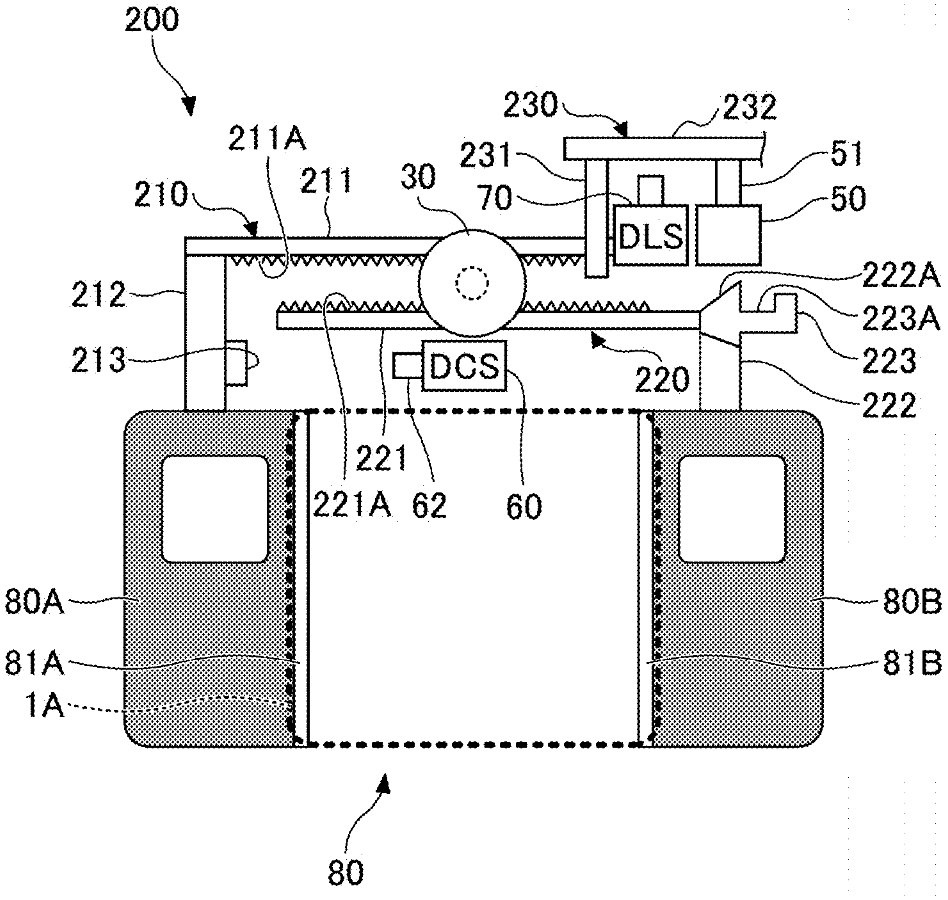
FIG. 6 is a schematic diagram illustrating an example of the arrangement structure of the door and the door drive mechanism of the train carriage.

FIG. 1 is a block diagram illustrating a configuration example associated with the opening and closing of the door 80 in the train carriage 1. FIGS. 2 to 6 are diagrams schematically illustrating an example of an arrangement structure of the door 80 and a door drive mechanism 200 in the train carriage 1. Specifically, FIG. 2 is a diagram schematically illustrating the door 80 and the door drive mechanism 200 in a fully closed and locked state of the door 80. FIG. 3 is a diagram schematically illustrating the door 80 and the door drive mechanism 200 in a fully closed and unlocked state. FIG. 4 is a diagram schematically illustrating the door 80 and the door drive mechanism 200, during opening (immediately after the door 80 starts opening) or closing (just before the door 80 finishes closing). FIG. 5 is a diagram schematically illustrating the door 80 and the door drive mechanism 200, during opening (just before the door 80 finishes opening) or closing (immediately after the door 80 starts closing). FIG. 6 is a diagram schematically illustrating the door 80 in the fully opened state of the door drive mechanism 200.

The train carriage 1 may be a single-car carriage that is composed of one car, or may be a plural-car carriage that is composed of a plurality of cars that are linked together.

As illustrated in FIGS. 1 to 6, the train carriage 1 includes a host device 10, a motor 30, an encoder 31, current sensors 32, a locking device 50, a door close switch (DCS) 60, a door lock switch (DLS) 70, and the door 80. The train carriage 1 also includes a door controller 100, a power source 150, an input contactor 151, and the door drive mechanism 200.

The host device 10 includes one or more carriage controllers 12, one or more door-operating devices 14, and a transmission device 16.

The carriage controller 12 performs a control for the operation of the train carriage 1. For example, when train carriages 1 have a plurality of cars, one carriage controller 12 is provided in each of a driver's room in a first car and a conductor's room in a last car. Also, for example, when the train carriage has one car, carriage controllers 12 are respectively provided in a front-side driver's room and a rear-side conductor's room of the train carriage 1 (carriage).

A function of the carriage controller 12 is implemented by any hardware, any combination of hardware and software, or the like. The carriage controller 12 is mainly implemented, for example, by a computer that includes a central processing unit (CPU), a memory device, an auxiliary storage device, and an input-and-output interface device for interfacing with an external device. The memory device is, for example, a static random access memory (SRAM). The auxiliary storage device includes, for example, an electrically erasable programmable read only memory (EEPROM) or a flash memory. The interface device includes, for example, a communication interface for coupling to a communication line that is inside the train carriage 1, or a communication line outside the train carriage 1. The interface device may also include an external interface for coupling an external recording medium. With this arrangement, for example, in a manufacturing process, a worker can install a program or various data, from the external recording medium to the auxiliary storage device or the like of the carriage controller 12, where the program or the various data is to be used to perform a process associated with the operational control of the train carriage 1. The program and various data used to perform the process associated with the operational control of the train carriage 1 may be downloaded from the outside of the train carriage 1, via the communication interface. Further, the interface device may include different types of interface devices, in light of the types of communication lines to be coupled.

When the train carriage 1 is stopped at a station or the like, the carriage controller 12 outputs a stop signal indicating that the train carriage 1 is stopped, to the door controller 100. The carriage controller 12 outputs, to the door controller 100, an open command to open the door 80, or a close command to close the door 80, where the open command or the close command from the door-operating device 14 is input to the door controller 100.

Lines 13 via which an interlock signal is transmitted are coupled to the carriage controller 12. The lines 13 are coupled, at respective ends, to the carriage controller 12, and the DCS 60 and the DLS 70 are provided on the respective lines 13. If at least one of the DCS 60 or the DLS 70 is in an off state, the lines 13 are in a non-conductive state. In this case, the interlock signal that is input to the carriage controller 12 becomes at a L (Low) level. In contrast, if both the DCS 60 and the DLS 70 are in an on state, the lines 13 are in a conductive state. In this case, the interlock signal that is input to the carriage controller 12 becomes at a H (High) level. When the interlock signal is at the H level, the carriage controller 12 determines that the train carriage 1 is in a movable state. With this arrangement, when the interlock signal changes from the L level to the H level, the train carriage 1 can travel.

The door-operating device 14 is used for a crew (for example, a conductor) of the train carriage 1 to open or close the door 80. The door-operating device 14 includes an opening switch 14A and a closing switch 14B. For example, when the opening switch 14A is operated during shutdown of the train carriage 1, the door-operating device 14 outputs the open command to change the interlock signal from the L level to the H level, to the carriage controller 12. Further, for example, when the closing switch 14B is operated during shutdown of the train carriage 1, the door-operating device 14 outputs the close command to change the interlock signal from the H level to the L level, to the carriage controller 12.

The transmission device 16 relays a signal between the door controller 100, which is provided for doors 80 of the train carriage 1, and the carriage controller 12.

Specifically, the transmission device 16 may receive various signals (input signals SDR) that are transmitted from the carriage controller 12 to one or more door controllers 100, and may then transmit the signals to a portion or all of the target door controllers 100. The transmission device 16 may also receive various signals (output signals SD) to be transmitted from respective door controllers 100 to the carriage controller 12, to transmit the signals to the carriage controller 12.

The motor 30 drives the door 80 to open and close. The motor 30 is, for example, a rotary machine that is driven by three-phase alternating current (AC) drive power. The motor 30 may be a linear motor that is driven by three-phase AC drive power. The motor 30 may be a direct current (DC) motor that is driven by direct current.

The encoder 31 detects a rotational position or a displacement position of the motor 30. For example, when the motor 30 is a rotary machine, the encoder 31 detects the rotational position (rotation angle) of a rotary shaft of the motor 30. The encoder 31 detects, for example, the rotational position (rotation angle) of the rotary shaft of the motor 30 that is rotating one time, and detects revolutions per minute (rpm) for the motor 30. The encoder 31 outputs a detection signal including information relating to the rotational position of the rotary shaft of the motor 30, and the detection signal is input to the door controller 100. With this arrangement, the door controller 100 can acquire position information of the door 80 with respect to an open-and-closed direction, based on the signal from the encoder 31. That is, information included in the signal from the encoder 31 corresponds to the position information of the door 80.

Current sensors 32 detect currents of the three-phase AC drive power that is supplied to the motor 30 by the door controller 100. The current sensors 32 include current sensors 32A and 32B that detect currents each of which flows via any two power lines among three power lines of a U-phase, a V-phase, and a W-phase, where the three power lines couple the door controller 100 to the motor 30. For example, the current sensor 32A detects a current for the U-phase power line, and the current sensor 32B detects a current for the W-phase power line. The current sensors 32 may include a current sensor that detects a current for the remaining one power line. For example, as illustrated in FIG. 1, the current sensors 32 may be incorporated in the door controller 100, or may be provided outside the door controller 100. Detection signals from the current sensors 32 (current sensors 32A and 32B) are each input to a normal controller 110 and a backup controller 120 as described below.

The locking device 50 locks and unlocks the door 80. The locking device 50 includes, for example, a pin 51 and coils 52 and 53, and is implemented by bidirectional self-holding solenoids. Each of the coils 52 and 53 is coupled to the door controller 100.

In the locking device 50, when the coil 52 is energized by the door controller 100, the pin 51 is protruded from a housing of the locking device 50. As a result, a lock pin 230 described below moves in an unlock direction, and thus the door 80 is unlocked. In addition, because the locking device 50 is a self-holding type, the locking device 50 maintains a state where the pin 51 protrudes from a housing of the locking device 50 even after the energization of the coil 52 is released. With this arrangement, the door 80 can be maintained in an unlocked state.

In the locking device 50, when the coil 53 is energized by the door controller 100, the pin 51 is drawn into the housing of the locking device 50. As a result, a lock pin 230 described below moves in a lock direction, and thus the door 80 is locked. In addition, because the locking device 50 is the self-holding type, the locking device 50 maintains a state where the pin 51 is drawn into the housing of the locking device 50 even after the energization of the coil 53 is released. With this arrangement, the door 80 can be maintained in a locked state.

The DCS 60 detects whether the door 80 of the train carriage 1 is open or closed. Specifically, the DCS 60 detects a fully closed state in which the door 80 of the train carriage 1 is fully closed. The DCS 60 is implemented, for example, by a limit switch that is pressed by the door 80 that operates when the door 80 moves to a fully closed position.

The DCS 60 includes fixed contacts 61A1 and 61A2, fixed contacts 61B1 and 61B2, and a movable contact 62.

The fixed contacts 61A1 and 61A2 are respectively arranged at ends of two lines into which the line 13 is divided. In the following description, the fixed contacts 61A1 and 61A2 may be referred to as an "A-contact pair" for the DCS 60, for convenience.

The fixed contacts 61B1 and 61B2 are arranged at ends of two lines into which a line 101 is divided, where the two lines are coupled to the door controller 100. With this arrangement, the door controller 100 can identify an on-off state of the DCS 60, in accordance with a H-level signal and a L-level signal, where the H-level signal indicates a conductive state of the fixed contacts 61B1 and 61B2, and the H-level signal indicates a non-conductive state of the fixed contacts 61B1 and 61B2. In the following description, the fixed contacts 61B1 and 61B2 may be referred to as a "B-contact pair" for the DCS 60, for convenience.

When the movable contact 62 moves along an axial direction (vertical direction in FIG. 1), one pair among the A-contact pair (fixed contacts 61A1 and 61A2) and the B-contact pair (fixed contacts 61B1 and 61B2) of the DCS 60 becomes conductive. In the DCS 60, in a state where no external force acts, the movable contact 62 makes the B-contact pair conductive. That is, the DCS 60 is held in a state where the B-contact pair is on and the A-contact pair is off. In contrast, in the DCS 60, as described below, when the movable contact 62 is pressed by the operation of the door 80, the A-contact pair is turned on in a state where the A-contact pair is conducted by the movable contact 62 while the B-contact pair is turned off. Then, in accordance with the operation of the door 80, the movable contact 62 returns to a state of not being pressed. In this case, the DCS 60 returns to a state where the B-contact pair, which is conducted by the movable contact 62, is turned on and the A-contact pair is turned off.

For example, the door controller 100 can identify an on-off state of the B-contact pair for the DCS 60, based on a signal that is input to the door controller 100 via the line 101. Further, for example, the door controller 100 can identify an on-off state of the A-contact pair for the DCS 60, by inverting the signal that is input to the door controller 100 via the line 101.

The DLS 70 detects whether the door 80 is locked. Specifically, the DLS 70 detects the locked state of the door 80. For example, when the lock pin 230 for the door 80 moves to a locking position, the DLS 70 is implemented by a limit switch that is pressed by the operation of the lock pin 230.

The DLS 70 includes fixed contacts 71A1 and 71A2, fixed contacts 71B1 and 71B2, and a movable contact 72.

The fixed contacts 71A1 and 71A2 are respectively arranged at ends of two lines into which the line 13 is divided. In the following description, the fixed contacts 71A1 and 71A2 may be referred to as an "A-contact pair" for the DLS 70, for convenience.

The fixed contacts 71B1 and 71B2 are arranged at ends of two lines into which a line 102 is divided, where the two lines are coupled to the door controller 100. With this arrangement, the door controller 100 can identify an on-off-state of the DLS 70, in accordance with a H-level signal and a L-level signal, where the H-level signal indicates a conductive state of the fixed contacts 71B1 and 71B2, and the H-level signal indicates a non-conductive state of the fixed contacts 71B1 and 71B2. In the following description, the fixed contacts 71B1 and 71B2 may be referred to as a "B-contact pair" for the DLS 70, for convenience.

When the movable contact 72 moves along an axial direction (vertical direction in FIG. 1), one pair among the A-contact pair (fixed contacts 71A1 and 71A2) and the B-contact pair (fixed contacts 71B1 and 71B2) of the DLS 70 becomes conductive. In the DLS 70, in a state where no external force acts, the movable contact 72 makes the B-contact pair conductive. That is, the DLS 70 is held in a state where the B-contact pair is on and the A-contact pair is off. In contrast, in the DLS 70, when the movable contact 72 is pressed by the operation of the lock pin 230, the A-contact pair is turned on, and the B-contact pair is turned off. Then, in the DLS 70, when the movable contact 72 returns to a state of not being pressed by the operation of the lock pin 230, the B-contact pair is turned on, and the A-contact pair is turned off.

For example, the door controller 100 can identify an on-off state of the B-contact pair for the DLS 70, based on a signal that is input to the controller 100 via the line 102. Further, for example, the door controller 100 can identify an on-off state of the A-contact pair for the DLS 70, by inverting the signal that is input to the door controller 100 via the line 102.

When the door 80 is fully closed and locked, both the A-contact pair for the DCS 60 and the A-contact pair for the DLS 70 are turned on, and thus the line 13 becomes conductive. As a result, the interlock signal becomes at the H level.

The door 80 is a double sliding door that is provided at an opening (hereinafter referred to as a "door opening") in each of a left side surface and a right side surface of a car body of the train carriage 1. The door 80 includes door panels 80A and 80B.

With use of the door panels 80A and 80B, the door 80 (door opening of the car body) is opened or closed using the door drive mechanism 200, in accordance with power from the motor 30. Specifically, the door panels 80A and 80B can close or open the door opening of the car body, by moving the door panels 80A and 80B in opposite directions, i.e., front and back directions, when viewed from a middle portion of the door opening of the car body in a front-and-back directions.

In the fully closed state of the door 80, door end rubbers 81A and 81B are respectively provided at portions of the door panels 80A and 80B that can be in contact with each other. Each of the door end rubbers 81A and 81B is provided in an area from an upper end, to a lower end, of a contact portion of a corresponding door panel with the other door panel, among the door panels 80A and 80B.

The door controller 100 performs a control relating to the opening and closing of the door 80. The door controller 100 is provided for each unit of multiple doors 80 that are provided in the train carriage 1.

A function of the door controller 100 is implemented by any hardware, any combination of hardware and software, or the like. The door controller 100 is mainly implemented, for example, by a computer that includes a central processing unit (CPU), a memory device, an auxiliary storage device, and an interface device for input and output with one or more external devices. The memory device is, for example, an SRAM. The auxiliary storage device includes, for example, an EEPROM, or a flash memory. The interface device includes, for example, a communication interface for coupling a communication line that is inside the train carriage 1. The interface device may also include an external interface for coupling an external recording medium. With this arrangement, for example, in a manufacturing process, an operator can install a program or various data relating to a control process for the door 80, from an external recording medium to be stored in an auxiliary storage device or the like of the door controller 100. The program or various data relating to the control process for the door 80 may be downloaded from the host device 10 through a communication interface. Further, the interface device may include different types of interface devices, in light of types of communication lines to be coupled.

The door controller 100 includes the normal controller 110, the backup controller 120, a switching circuit 130, and a switching circuit 140.

The normal controller 110 performs a control for opening and closing the door 80. The normal controller 110 includes a power circuit 111, a communication unit 112, an input signal detector 113, a sequence unit 114, a motor controller 115, a motor drive unit 116, and a locking-and-unlocking drive unit 117.

The power circuit 111 functions as a drive power source that is used for various devices of the normal controller 110. With use of power of a relatively high voltage (for example, 100 V) that is supplied to the door controller 100 by the power source 150, the power circuit 111 generates power of a relatively low voltage (for example, 5 V or lower) for driving the devices of the normal controller 110.

The communication unit 112 performs a two-way communication with the transmission device 16 that is outside the door controller 100.

The input signal detector 113 detects various signals that are input from the outside of the door controller 100.

The input signal detector 113 may perform various processes based on one or more detected signals.

For example, upon detecting a predetermined signal among input signals, the input signal detector 113 transmits the predetermined signal to the sequence unit 114 or the motor controller 115. That is, the input signal detector 113 extracts (selects) the signal necessary for the control of the sequence unit 114 or the motor controller 115, from multiple types of input signals, and then transmits the signal to the sequence unit 114 or the motor controller 115. With this arrangement, as described below, the sequence unit 114 and the motor controller 115 can appropriately perform a sequence control and a drive control for the motor 30, respectively, based on one or more signals that are input from the input signal detector 113.

The sequence unit 114 performs the sequence control for opening and closing the door 80, based on the signal that is input from the input signal detector 113. Specifically, the sequence unit 114 performs the sequence control for opening and closing the door 80, in accordance with a stop signal, an open command, a close command, and the like that are from the carriage controller 12. The sequence unit 114 also performs the sequence control for opening and closing the door 80, while identifying an open-and-close state of the door 80, a position of the door 80 in the open-and-closed direction, and the presence or absence of the locking of the door 80, and the like, by using signals from the encoder 31, the DCS 60, and the DLS 70, and the like.

The motor controller 115 performs a drive control of the motor 30 such that the door 80 is opened or closed in accordance with a control command that relates to the opening or closing of the door 80 and is from the sequence unit 114. For example, the motor controller 115 generates a pulse width modulation (PWM) signal for driving the motor 30, based on a speed command and a propulsion command of the motor 30 that are input from the sequence unit 114, and then outputs the PWM signal to the motor drive unit 116. Specifically, the motor controller 115 may generate the PWM signal that matches the speed command and the propulsion command, while identifying the current in the motor 30, the rotational position of the rotary shaft of the motor 30, and the like, by using one or more detection signals at the encoder 31, the current sensors 32, and the like, where the detection signals are input from the input signal detector 113.

The motor drive unit 116 generates and outputs three-phase AC power for driving the motor 30, by using the DC power that is input from the power source 150. The motor drive unit 116 includes, for example, an inverter circuit that converts DC into three-phase AC having a predetermined voltage and a predetermined frequency. In the motor drive unit 116, two input-side DC power lines are coupled to the power source 150 through the input contactor 151, and three output-side power lines are coupled to the motor 30 through the switching circuit 130.

The locking-and-unlocking drive unit 117 energizes the coil 52 or 53 of the locking device 50, in accordance with a lock command or an unlock command that is input from the sequence unit 114, and then drives the locking device 50 (pin 51) in a lock direction or an unlock direction of the door 80. In the locking-and-unlocking drive unit 117, input-side DC power lines consisting of a positive line and a negative line are coupled to the power source 150 through the input contactor 151. Also, in the locking-and-unlocking drive unit 117, one among two sets of output-side DC power lines, which consist of a positive line and a negative line, is coupled to the coil 52 through the switching circuit 140, and the other set is coupled to the coil 53 through the switching circuit 140. For example, the locking-and-unlocking drive unit 117 includes a semiconductor switch capable of switching power lines between conduction and non-conduction, where the power lines include a power line between the input-side DC power lines and one set of the output-side DC power lines, and include a power line between the input-side DC power lines and the other set of the output-side DC power lines. The locking-and-unlocking drive unit 117 switches the semiconductor switch on and off. Specifically, in response to receiving the unlock command from the sequence unit 114, the locking-and-unlocking drive unit 117 may shift a power line state between the input-side DC power lines and any one set of the output-side DC power lines, to the conductive state, to thereby energize the coil 52 of the locking device 50 through the switching circuit 140. In addition, in response to receiving the lock command from the sequence unit 114, the locking-and-unlocking drive unit 117 may shift a power line state between the input-side DC power lines and the other set of output-side DC power lines, to the conductive state, to thereby energize the coil 53 of the locking device 50 through the switching circuit 140.

The backup controller 120 is configured to be able to perform the control for opening and closing the door 80, and functions as a backup of the normal controller 110. With this arrangement, in the door controller 100, the backup controller 120 is provided in addition to the normal controller 110, and redundancy of a control system related to the opening and closing of the door 80 is enabled. Specifically, when an abnormality occurs in the normal controller 110, the backup controller 120 performs the control for opening and closing the door 80, instead of using the normal controller 110.

The backup controller 120 includes the same components as those of the normal controller 110. Specifically, the backup controller 120 includes a power circuit 121, a communication unit 122, an input signal detector 123, a sequence unit 124, a motor controller 125, a motor drive unit 126, and a locking-and-unlocking drive unit 127.

The power circuit 121 has the same hardware configuration and function as described in the power circuit 111 of the normal controller 110. The communication unit 122 has the same hardware configuration and function as described in the communication unit 112 of the normal controller 110. The input signal detector 123 has the same hardware configuration and function as described in the input signal detector 113 of the normal controller 110. Further, the sequence unit 124 has the same hardware configuration and function as described in the sequence unit 114 of the normal controller 110. The motor controller 125 has the same hardware configuration and function as described in the motor controller 115 of the normal controller 110. The motor drive unit 126 has the same hardware configuration and function as described in the motor drive unit 116 of the normal controller 110. The locking-and-unlocking drive unit 127 has the same hardware configuration and function as described in the locking-and-unlocking drive unit 117 of the normal controller 110. In light of the above, detailed description thereof is omitted.

The switching circuit 130 switches between a state in which the motor drive unit 116 and the motor 30 are electrically coupled to each other and a state in which the motor drive unit 126 and the motor 30 are electrically coupled to each other. Specifically, three-phase AC output power lines of each of the motor drive unit 116 and the motor drive unit 126 are coupled to an input side of the switching circuit 130, and three-phase AC input power lines that extend from the motor 30 are coupled to an output side of the switching circuit 130. The switching circuit 130 switches between a state in which the output power lines of the motor drive unit 116 and input power lines of the motor 30 conduct and a state in which the output power lines of the motor drive unit 126 and the input power lines of the motor 30 conduct.

The switching circuit 130 maintains a state in which the motor drive unit 116 and the motor 30 are electrically coupled to each other, when the normal controller 110 performs the control for opening and closing the door 80. Also, when the abnormality occurs in the normal controller 110, and then the backup controller 120 performs the control for opening and closing the door 80, the switching circuit 130 switches to a connection state in which the motor drive unit 126 and the motor 30 are electrically coupled to each other.

The switching circuit 140 switches between a state in which the locking-and-unlocking drive unit 117 and the locking device 50 (coil 52 or 53) are coupled to each other and a state in which the locking-and-unlocking drive unit 127 and the locking device 50 (coil 52 or 53) are coupled to each other. Specifically, two sets of output power lines, for each of the locking-and-unlocking drive unit 117 and the locking-and-unlocking drive unit 127, are coupled to an input side of the switching circuit 140, and two sets of input power lines that extend from the locking device 50 (coil 52 and 53) are coupled to an output side of the switching circuit 150. Further, the switching circuit 140 switches between a state in which the two sets of output power lines for the locking-and-unlocking drive unit 117 are coupled to the two sets of input power lines of the locking device 50, and a state in which the two sets of output power lines of the locking-and-unlocking drive unit 127 are coupled to the two sets of input power lines of the locking device 50.

When the normal controller 110 performs the control for opening and closing the door 80, the switching circuit 140 maintains a state in which the locking-and-unlocking drive unit 117 and the locking device 50 (coil 52 or 53) are electrically coupled to each other. Also, when an abnormality occurs in the normal controller 110, and then the backup controller 120 shifts a control state to a state in which the opening and closing of the door 80 are controlled, the switching circuit 140 switches to a state in which the locking-and-unlocking drive unit 127 and the locking device 50 (coil 52 or 53) are electrically coupled to each other.

The power source 150 supplies DC power of a predetermined voltage (for example, 100 volts) to various devices of the train carriage 1, and the various devices include the motor 30, the locking device 50, and the door controller 100. The power source 150 includes, for example, a battery and an auxiliary power source device. The battery supplies DC power to the various devices of the train carriage 1, in a state where a pantograph of the train carriage 1 is not coupled to an overhead line. The auxiliary power source device generates DC power, based on power that is supplied via the overhead line from the pantograph, in a state where the pantograph of the train carriage 1 is coupled to the overhead line. Then, the auxiliary power source device supplies the DC power to the various devices of the train carriage 1.

The input contactor 151 is provided in a power circuit between the power source 150 and various devices that include the door controller 100. The input contactor 151 switches between supply of power to the various devices of the train carriage 1 and interruption of the supply, by opening and closing the power circuit. The input contactor 151 is closed, for example, in accordance with a predetermined operation, such as power-up that is enabled in a driver's room of the train carriage 1. With this arrangement, power is supplied to various devices of the train carriage 1, including the door controller 100, and thus the train carriage 1 is activated. In addition, the input contactor 151 is opened, for example, in accordance with a predetermined operation such as power-down that is enabled in the driver's room of the train carriage 1. With this arrangement, supply of power to various devices of the train carriage 1 including the door controller 100 is stopped (interrupted), and thus the train carriage 1 is stopped.

The door drive mechanism 200 transmits the power of the motor 30 to the door 80 to open or close the door 80. The door drive mechanism 200 implements the locked state or the unlocked state of the door 80, in accordance with the movement of the locking device 50 (pin 51).

The door drive mechanism 200 includes racks 210 and 220 and the lock pin 230.

The rack 210 is attached to an upper end portion of the door panel 80A. The rack 210 includes a rack portion 211 and a connection portion 212.

The rack portion 211 is a member that extends in the front-and-back direction of the train carriage 1. A rack gear 211A is provided on a lower surface of the rack portion 211. The rack portion 211 is disposed above the door opening of the train carriage 1 (car body) to be slightly above the rotary shaft of the motor 30 whose rotary shaft is disposed along a width direction (left-right direction) of the train carriage 1. With this arrangement, a pinion gear, which is disposed coaxially with the rotary shaft of the motor 30, can be engaged with the rack gear 211A on the lower surface of the rack portion 211. Thus, the rack portion 211 can be moved in the front-and-back direction of the train carriage 1, in accordance with the rotation of the motor 30.

The connection portion 212 couples the door panel 80A and the rack portion 211. The connection portion 212 is provided so as to extend upward from an upper end portion of the door panel 80A, and the rack portion 211 is coupled to an upper end portion of the connection portion 212. With this arrangement, the door panel 80A moves in the front-and-back direction of the train carriage 1, in conjunction with the movement of the rack portion 211 that corresponds to the rotation of the motor 30, and the opening-and-closing operation of the door 80 can be realized. In this case, the movement of the door panel 80A in the front-and-back direction is guided by a slide rail (hereinafter referred to as a "door rail").

A DCS contact 213 is provided with the connection portion 212.

As illustrated in FIGS. 2 and 3, when the door panels 80A and 80B transition to the fully closed state, the DCS contact 213 comes into contact with the movable contact 62 of the DCS 60, and thus the movable contact 62 is pressed. With this arrangement, the movable contact is pushed to turn the DCS 60 on. In contrast, as illustrated in FIGS. 4 to 6, when the door panels 80A and 80B transition to a state other than the fully closed state of the door panel 80A, the DCS contact 213 transitions to a state in which the DCS contact 213 does not contact the movable contact 62 of the DCS 60, and thus the DCS 60 is turned off.

The rack 220 is attached to an upper end portion of the door panel 80B. The rack 220 includes a rack portion 221, the connection portion 212, and the lock-pin contact portion 223.

The rack portion 221 is a member that extends in the front-back direction of the train carriage 1. A rack gear 221A is provided on an upper surface of the rack portion 221. The rack portion 221 is disposed above the door opening of the train carriage 1 to be slightly below the rotary shaft of the motor 30. With this arrangement, the pinion gear disposed coaxially with the rotary shaft of the motor 30 can be engaged with the rack gear 211A on the upper surface of the rack portion 221. Thus, the rack portion 221 can be moved in the front-and-back direction of the train carriage 1, in accordance with the rotation of the motor 30.

The connection portion 222 couples the door panel 80B and the rack portion 221. The connection portion 222 is provided so as to extend upward from the upper end portion of the door panel 80B, and the rack portion 221 is coupled to the upper end portion of the connection portion 222. With this arrangement, the door panel 80B moves in the front-and-back direction of the train carriage 1, in conjunction with the movement of the rack portion 221 that corresponds to the rotation of the motor 30, and the opening-and-closing operation of the door 80 can be realized. In this case, the movement of the door panel 80B in the front-and-back direction is guided by a slide rail (door rail).

In this description, the rack gear 211A is engaged with the pinion gear that is disposed coaxially with the motor 30, when viewed from above. The rack gear 221A is engaged with the pinion gear, when viewed from below. Thus, the racks 210 and 220 can be moved in an opposite direction, in accordance with the rotation of the motor 30. Therefore, the opening and the closing of the two door panels 80A and 80B can be realized using one motor 30.

An inclined portion 222A that slopes down toward a middle side of the door opening, with respect to the front-and-back direction of the train carriage 1, is provided at the upper end portion of the connection portion 222.

In the locked state of the door 80, the lock-pin 230 is in contact with the lock-pin contact portion 223. The lock-pin contact portion 223 is provided so as to protrude from an end side of the connection portion 222, where the end side is opposite a direction in which the rack portion 221 extends. A lock hole 223A is provided in the lock-pin contact portion 223.

The lock hole 223A is a recess that is provided at the upper surface of the lock-pin contact portion 223. When the door 80 is locked, a lower end of the lock pin 230 (a pin 231 described below) is inserted in the lock hole 223A.

The lock pin 230 is provided above the lock-pin contact portion 223 of the rack 220. The lock pin 230 includes the pin 231 and a locking-device contact portion 232.

The pin 231 is provided to extend in the vertical direction.

The locking-device contact portion 232 is attached to an upper end portion of the pin 231, and is provided so as to extend from a connection with the pin 231 in a horizontal direction. Specifically, the locking-device contact portion 232 is provided to extend in a direction opposite the direction in which the door opening extends in the front-and-back direction of the train carriage 1. The locking device 50 is fixedly disposed below the locking-device contact portion 232, and the upper end portion of the pin 51 of the locking device 50 contacts the lower surface of the locking-device contact portion 232. With this arrangement, when the pin 51 of the locking device 50 is protruded upward, the locking-device contact portion 232 moves upward, and when the pin 51 of the locking device 50 is drawn in a downward direction, the locking-device contact portion 232 moves downward by the weight of the lock pin 230.

As illustrated in FIGS. 3 to 6, in a state in which the pin 51 of the locking device 50 is protruded, the lower end of the pin 231 that is coupled to the locking-device contact portion 232 is positioned higher than the inclined portion 222A of the rack 220, and thus the pin 231 does not engage with the lock hole 223A. With this arrangement, the rack 220 can move without being influenced by the arrangement of the lock pin 230, and thus the door 80 (the door panels 80A and 80B) becomes in a state of being movable in the open and closed directions.

In contrast, as illustrated in FIG. 2, in a state where the pin 51 of the locking device 50 is drawn, the lower end of the pin 231 is positioned lower than the inclined portion 222A of the rack 220. Further, in the fully closed state of the door 80, the pin 231 is positioned closer to the lock-pin contact portion 223 than the inclined portion 222A in the front-and-back direction of the train carriage 1. With this arrangement, when the pin 51 of the locking device 50 is drawn in the fully closed state of the door 80, the locking-device contact portion 232 moves downward, and thus the pin 231 engages with the lock hole 223A (protruding portion) of the rack 220. As a result, the movement of the rack 220 is restricted, and the rotation of the pinion gear that engages with the rack gear of the rack 220 is restricted. Thus, the movement of the rack 210 having the rack gear 211A that engages with the pinion gear is restricted. Therefore, the movement of the door panels 80A and 80B that are respectively coupled to the racks 210 and 220 is restricted, and the locked state of the door panels 80A and 80B is held.

Abnormality Diagnosis for Traveling Resistance of Door

Hereinafter, the abnormality diagnosis for the traveling resistance of the door 80 will be described with reference to FIG. 7 and FIG. 8. In this description, a subject that diagnoses the abnormality in the traveling resistance of the door 80 will be described as a diagnostic system SYS, for convenience.

Figure 7:
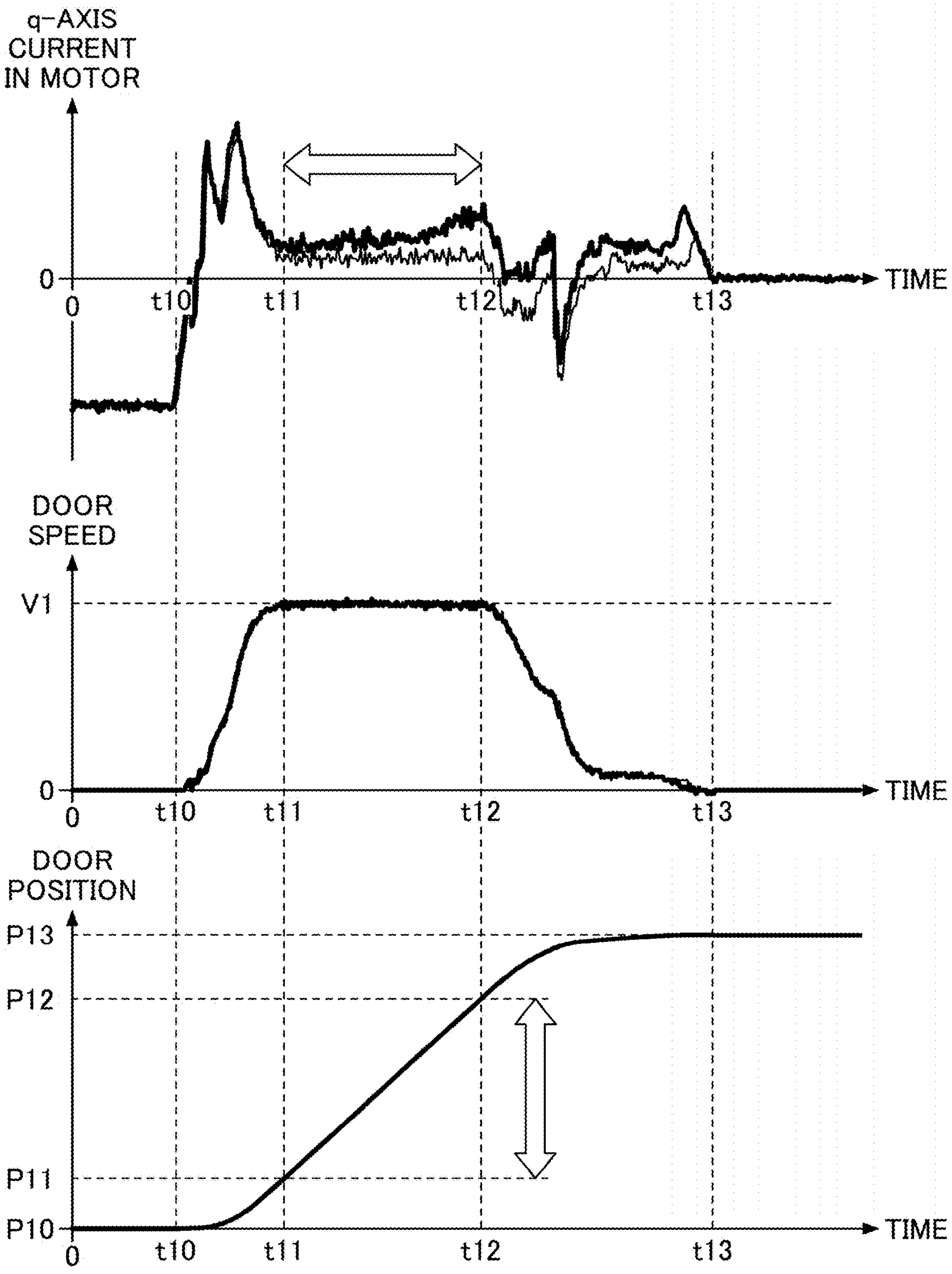
FIG. 7 is a diagram illustrating an example of temporal changes in a motor current, a speed of the door, and a position of the door, in a normal mode in which the door is opened and closed.

FIG. 7 is a diagram illustrating an example of temporal changes in the current in the motor 30, a speed of the door 80, and a position of the door 80, in the normal mode in which the door 80 is opened or closed. Specifically, FIG. 7 illustrates a specific example of the temporal changes in the current in the motor 30, the speed of the door 80, and the position of the door 80 in the normal mode in which the door 80 is opened or closed, under each of a normal condition (thin solid line) and an abnormal condition (thick solid line) of the door 80. In this example, the door 80 is held in an abnormal state in which the traveling resistance is greater than the traveling resistance under the normal condition, over the entire section between the fully closed position and the fully opened position of the door 80. FIG. 8 is a diagram illustrating an example of temporal changes in the current in the motor 30, the speed of the door 80, and the position of the door 80, in diagnostic mode in which the door 80 is opened or closed. Specifically, FIG. 8 illustrates a specific example of the temporal changes in the current in the motor 30, the speed of the door 80, and the position of the door 80, in the diagnostic mode in which the door 80 is opened or closed in a normal state.

The door controller 100 (each of the motor controller 115 or the motor controller 125) has the normal mode and the diagnostic mode, as control modes that relate to each of opening and closing of the door 80.

The normal mode is a control mode relating to each of the opening and closing of the door 80, and is used when a passenger of the train carriage 1 gets on and off through the door opening. In the normal mode, the door controller 100 operates (travels) the door 80 at a constant speed V1.

The diagnostic mode is a control mode relating to each of the opening and closing of the door 80, and is used to measure (acquire) data for diagnosing an abnormality in the door 80 (hereinafter simply referred to as "abnormality diagnosis"). In the diagnostic mode for the door 80, the door controller 100 operates (travels) the door 80 at a constant speed V2. The speed V2 is lower than the speed V1 (V2<V1).

The speed V2 may not be a constant speed.

The abnormality diagnosis includes, for example, diagnosing of the presence or absence of an abnormality, diagnosing of a degree of abnormality, and the like. The diagnosing of the abnormality in the door 80 includes, for example, diagnosing of an abnormality in the traveling resistance of the door 80. The abnormality in the traveling resistance of the door 80 means a state in which the magnitude of the operational resistance (traveling resistance) acting on the door 80 that is opened or closed, is relatively significantly deviated from the normal state, which is used as a criterion. The state in which the magnitude of the operational resistance is relatively significantly deviated from the normal state may refer to a state in which a difference between the magnitude of the traveling resistance, which actually acts on the door 80, and a reference value in the normal state, is greater than or equal to a predetermined threshold, or may be a state in which the difference exceeds the threshold.

The abnormality in the traveling resistance of the door 80 includes, for example, a shortage of grease or fouling at the door rail. In addition, the abnormality in the traveling resistance of the door 80 may include intrusion of foreign matter into the door rail, or distortion (deformation) in the door rail. The abnormality in the traveling resistance of the door 80 may include changes in a tilt state of the door rail in the front-and-back direction.

When the door 80 operates (is opened or closed), the door 80 needs to accelerate from a speed of zero to enter a steady state. The steady state of the door 80 corresponds to a traveling state in which the door 80 moves based on a target value (a value corresponding to the speed V1 in the normal mode or the speed V2 in the diagnostic mode) indicative of the speed of the door 80. With this arrangement, in the entire operating section between the fully closed position to the fully opened position of the door 80, an end-side section that includes a starting position (each of a fully closed position set at the time of opening, and a fully open position set at the time of closing) of the door 80 is an operating section corresponding to a transient state of the door 80 in which the door 80 is accelerated to a control target value indicative of the speed of the door 80.

Likewise, when the door 80 stops, the door 80 needs to be decelerated from the steady state. In this case, in the entire operating section from the fully closed position to the fully opened position of the door 80, the other end-side section that includes a stop position of the door 80 (the fully opened position at the time of opening, or the fully closed position at the time of closing) is an operating section corresponding to the transient state of the door 80 in which the door 80 is decelerated to the speed of zero.

For example, as illustrated in FIG. 7, in the normal mode, the speed V1 in the steady state is relatively high. In this case, within the entire time period from the starting (time t10) to the stopping (time t13) of operation of the door 80, the percentage of a time period (from time t10 to time t11) required to accelerate the door 80 to reach the speed V1 (time t11) is relatively high. In addition, an average speed that is obtained during the time period (time t10 to time t11) until the speed of the door 80 reaches the speed V1, after the door 80 operates, is increased accordingly. Therefore, a percentage of a section in which the door 80 is in the transient state from the position P10, at which the door 80 begins to operate to the position P11, at which the speed of the door 80 reaches the speed V1, in the entire operating section between the starting position P10 and the stop position P13 of the door 80, becomes relatively high.

Likewise, in the entire time period from the starting to the stopping of the operation of the door 80, a percentage of a time period (from time t12 to time t13) required to begin (time t12) to decelerate the door 80 and then stop (time t13) the operation is relatively high. In addition, an average speed that is obtained within the time period (from time t12 to time t13) from decelerating the door 80, to stopping the door 80 is increased accordingly. As a result, a percentage of a transient state section from the position P12 at which the door 80 begins to decelerate, to the position P13 at which the door 80 stops the operation, is relatively increased.

With this arrangement, in the entire operating section from the position P10 at which the door 80 begins to operate, to the position P13 at which the door 80 stops the operation, a percentage of the steady state section of the door 80, that is, a section from the position P11 to the position P12 becomes lower.

Figure 8:
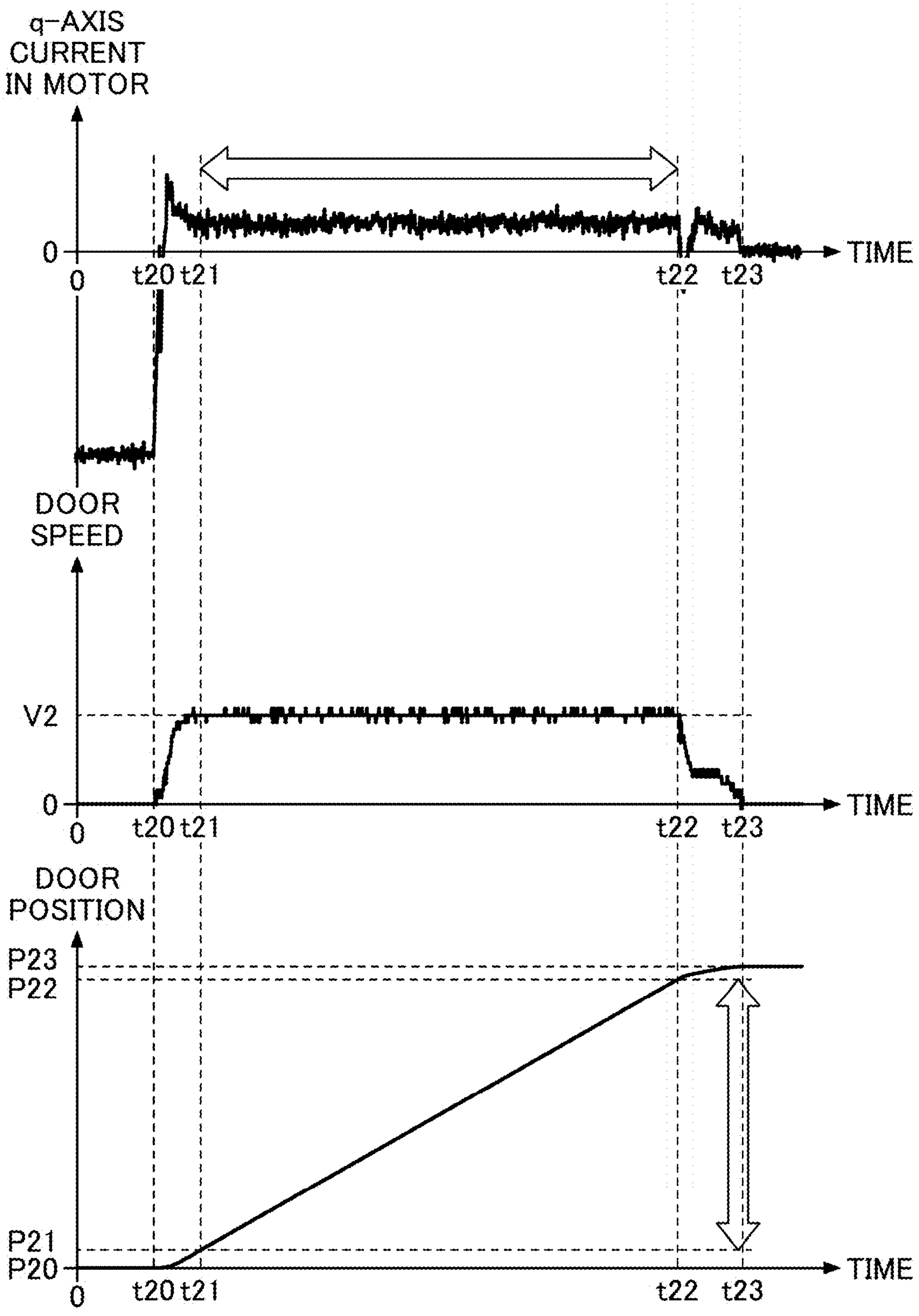
FIG. 8 is a diagram illustrating an example of temporal changes in the motor current, the speed of the door, and the position of the door, in a diagnostic mode in which the door is opened and closed.

In contrast, as illustrated in FIG. 8, in the diagnostic mode, the speed V2 in the steady state is relatively low. With this arrangement, in the entire time period from the starting (time t20) to the stopping (time t23) of the operation of the door 80, a percentage of a time period (from time t20 to time t21) required to accelerate the door 80 to the speed V2 (time t21) is relatively small. In addition, an average speed in a time period (from time t20 to time t21) from the starting point to a point at which the speed V2 is reached is reduced accordingly. Therefore, a percentage of a transient state section of the door 80, from the position P20 at which the door 80 begins to operate to the position P21 at which the speed V2 of the door 80 is reached, in the entire operating section from the position P20 at the door 80 begins to operate to the position P23 at which the door 80 stops the operation, becomes relatively small.

Likewise, in the entire time period from the starting to the stopping of the operation of the door 80, the percentage of a time period (from time t22 to time t23) required for the door 80 to decelerate (time t22) and then stop the operation is relatively small. In addition, an average speed in a time period (from time t22 to time t23) from decelerating the door 80 to stopping the door 80 is reduced accordingly. As a result, a percentage of the transient state section of the door 80, from the position P22 at which the door 80 decelerates to the position P23 at which the door 80 stops the operation, becomes relatively small.

With this arrangement, a percentage of the steady state section of the door 80, that is, the section from the position P20 to the position P23, in the entire operating section from the position P21, at which the door 80 begins to operate, to the position P22 at which the door 80 stops the operation, becomes high.

Here, it is assumed that an abnormality in the traveling resistance of the door 80 is diagnosed using measurement data of a q-axis current in the motor 30 that flows while the door 80 is opened or closed in the normal mode.

As illustrated in FIG. 7, in the time period that is from time t11 to time t12 and corresponds to the steady state of the door 80, a great difference in the q-axis current in the motor 30 between the normal condition of the door 80 and the abnormal condition, in which the traveling resistance of the door 80 is relatively great, can be found. In contrast, in the time period from time t10 to time t11 and the time period from time t12 to time t13, which correspond to the transient state of the door 80, changes in the q-axis current in the motor 30 become very great. As a result, in each section corresponding to the transient state of the door 80, the difference in the q-axis current in the motor 30 between the normal condition of the door 80 and the abnormal condition, in which the traveling resistance of the door 80 is relatively great, may be drowned in changes in the q-axis current in the motor 30 itself. With this arrangement, an abnormality in the traveling resistance of the door 80 can be appropriately diagnosed using the q-axis current in the motor 30, in only a steady state section of the door 80, in the entire operating section between the fully closed position and the fully opened position of the door 80. As a result, in the entire operating section between the fully closed position and the fully opened position of the door 80, there may be cases where the abnormality in the traveling resistance of the door 80 cannot be diagnosed in a relatively wide range that includes both end sides of the entire operating section.

In contrast, in the present embodiment, the diagnostic system SYS diagnoses the abnormality in the traveling resistance of the door 80, based on measurement data of the current (for example, the q-axis current) in the motor 30 in the diagnostic mode in which at least one of opening or closing of the door 80 is performed. In this case, in the entire operating section between the fully closed position and the fully opened position of the door 80, a section in which any abnormality in the traveling resistance of the door 80 can be diagnosed becomes relatively long. With this arrangement, by using the diagnostic mode, any abnormality in the traveling resistance of the door 80 can be diagnosed in a relatively wide operating section that includes respective sections in proximity to the fully closed position and the fully opened position of the door 80, in the entire operating section between the fully closed position and the fully opened position of the door 80.

In the present embodiment, as described above, in the diagnostic mode, the door controller 100 measures the current or the like, in a case where the speed of the door 80 is the speed V2 that is lower than the speed V1 in the normal mode. With this arrangement, the door controller 100 can suppress a power consumption amount of the door 80, while measuring data that is used to diagnose the abnormality in the door 80. Thus, for example, even in a case where doors 80 in the left-right direction of the train carriage 1 cannot be opened or closed simultaneously in the normal mode due to an insufficient power consumption amount, the doors 80 in the left-right direction of the train carriage 1 are opened or closed simultaneously in the diagnostic mode to thereby measure the data.

For example, the diagnostic system SYS diagnoses the abnormality in the traveling resistance of the door 80, based on a degree of mismatch between time-series measurement data for the door 80 and reference data, where the time-series measurement data is obtained in the diagnostic mode in which the door 80 is opened or closed during a steady state period. Specifically, the diagnostic system SYS may diagnose that there is an abnormality in the traveling resistance of the door 80 if the degree of mismatch is relatively greater than a predetermined criterion. A relatively greater degree of mismatch than the predetermined criterion may mean that the degree of mismatch is greater than or equal to a predetermined criterion, or may mean that the degree of mismatch exceeds the predetermined criterion. The reference data is data typically indicating a time series current in the motor 30 in the diagnostic mode in which the door 80 is opened or closed in the normal state. The measurement data of the current in the motor 30 that flows while opening or closing the door 80 is used to diagnose the abnormality, and the measurement data may be measurement data of the current in the motor 30 that flows while opening the door 80, may be measurement data of the current in the motor 30 that flows while closing the door 80, or may include both pieces of the above measurement data. When time-series measurement data of the current in the motor 30 that flows while opening the door 80 is used to diagnose any abnormality in the traveling resistance of the door 80, data that typically indicates time-series measurement data of the current in the motor 30 that flows while opening the door 80 in the normal state is used as reference data. Likewise, when time-series measurement data of the current in the motor 30 that flows while closing the door 80 is used to diagnose any abnormality in the traveling resistance of the door 80, data indicating time-series measurement data of the current in the motor 30 that flows while closing the door 80 in the normal state is used as reference data.

The diagnostic system SYS may use any method to determine whether the degree of mismatch between the time-series measurement data and the reference data, for the current in the motor 30 during a steady state period of the door 80 that is set while the door 80 is opened or closed in the diagnostic mode, is relatively high, compared to a predetermined reference.

For example, a threshold Th01 that is greater than a current level of the motor 30 that is derived from the reference data, and a threshold Th02 that is less than the current level of the motor 30 that is derived from the reference data, are set. In this case, the diagnostic system SYS can determine that the degree of mismatch is relatively greater than the predetermined criterion, if the time-series measurement data of the current in the motor 30 in the diagnostic mode is relatively greater than the reference value Th01, or if the time-series measurement data is relatively less than the reference value Th02. A case where the measurement data is relatively greater than the predetermined value Th01 may mean that the measurement data is the predetermined value Th01 or greater, or may mean that the measurement data is greater than the predetermined value Th01. Likewise, a case where the measurement data is relatively smaller than the reference value Th02 may mean that the measurement data is the reference value Th02 or smaller, or may mean that the measurement data is smaller than the reference value Th02.

In addition, the diagnostic system SYS may evaluate the degree of mismatch, based on pattern matching or the like between measurement data, and reference data, for the current in the motor 30 in the diagnostic mode in which the door 80 is opened or closed during the steady state period. Then, the diagnostic system SYS may determine whether the degree of mismatch is relatively higher than the predetermined criterion.

In addition, as described below, there may be cases (see, FIGS. 15 to 18) of using measurement data of the current in the motor 30 that is obtained while a large number of doors 80 are opened and closed, where the measurement data corresponds to big data. In this case, the diagnostic system SYS may apply machine learning (unsupervised learning) such as clustering, based on the measurement data of the current in the motor 30 that is obtained while a large number of doors 80 are opened and closed. Then, the diagnostic system SYS may diagnose the presence or absence of an abnormality, or the presence or absence of a sign or the like of the abnormality, in a target door 80.

Instead of, or in addition to measurement data of the current in the motor 30, the diagnostic system SYS may diagnose an abnormality in the door 80, by using data relating to a drive torque of the motor 30 that is used as a rotary machine. The data relating to the drive torque of the motor 30 is, for example, data of a torque command value that is generated in the door controller 100. The data relating to the drive torque of the motor 30 is data that is obtained by a torque meter or the like. When the motor 30 is a linear motor, the diagnostic system SYS may diagnose the abnormality in the door 80, by using data relating to propulsion of the motor 30, instead of, or in addition to measurement data of the current of the motor 30. The diagnostic system SYS may diagnose the abnormality in the door 80, by using data relating to the speed of the motor 30, instead of, or in addition to measurement data of the current in the motor 30. The speed of the motor 30 is a rotational speed of the motor 30 that is used as a rotary machine, or is a moving speed of the motor 30 (movable element) that is used as a linear motor. The data relating to the speed of the motor 30 is, for example, data of a detected speed that is calculated from information on a position of the motor 30, which is output from the encoder 31. That is, the data is measurement data of the speed of the motor 30. The data relating to the speed of the motor 30 may be data of a difference between a speed command value that is generated in the door controller 100 and, a detected speed that is calculated from information relating to the position of the motor 30 that is output from the encoder 31. As described above, the diagnostic system SYS can diagnose the abnormality in the door 80 by using any other type of data relating to the driving of the door 80, such as data relating to a drive torque or propulsion of the motor 30, or the speed of the motor 30, as in a case where measurement data of the current in the motor 30 is used.

Estimation of Cause of Abnormality in Traveling Resistance of Door

Hereinafter, a method for estimating a cause of the abnormality in the traveling resistance of the door 80 will be described with reference to FIGS. 9 to 12.

The diagnostic system SYS may diagnose the presence or absence of the abnormality in the traveling resistance of the door 80, as well as estimating the cause of the abnormality, or the cause of a sign of the abnormality.

First Example

Figure 9:
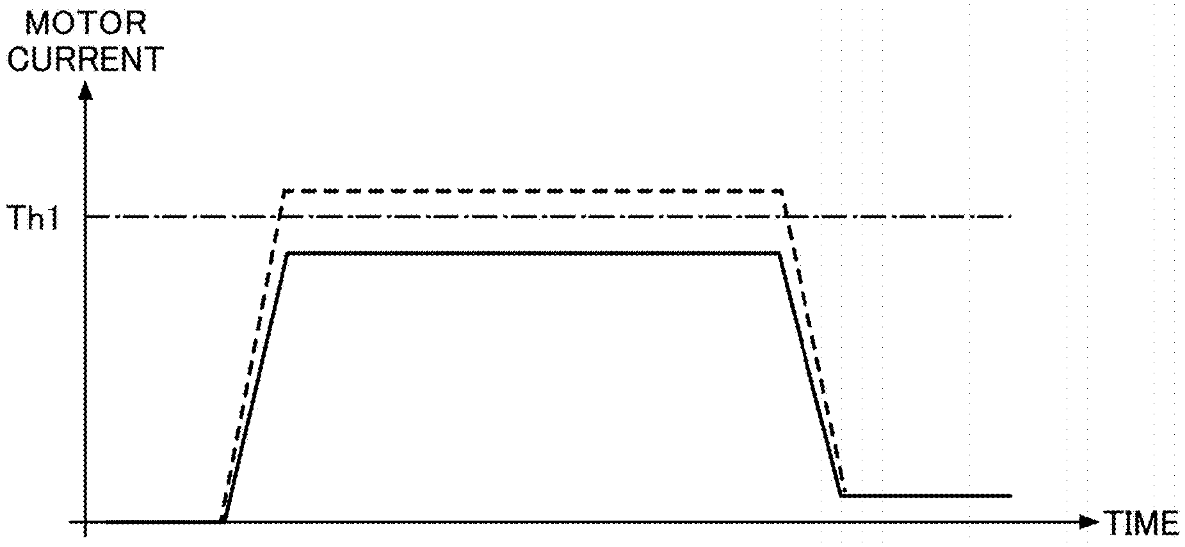
FIG. 9 is a diagram schematically illustrating a first example of the motor current during opening and closing of the door, in a case where an abnormality in the traveling resistance of the door occurs.

FIG. 9 is a diagram schematically illustrating a first example of the current in the motor 30 that is obtained during opening and closing of the door 80, in a case where an abnormality in the traveling resistance of the door 80 occurs. Specifically, FIG. 9 is the diagram schematically illustrating a specific example (broken line) of a time series current in the motor 30 during opening or closing of the door 80, in a case where the abnormality in the traveling resistance of the door 80 occurs due to a shortage of grease or fouling at a door rail. In addition, FIG. 9 illustrates time-series data (solid line) schematically indicating the current in the motor 30 under the normal condition in which the door 80 is opened and closed.

As illustrated in FIG. 9, when a shortage of grease or fouling at the door rail occurs, the current in the motor 30 that is obtained during the opening or closing of the door 80 tends to greatly deviate from the current under the normal condition, over the entire steady state period of the door 80. In such a case, when a mismatch (difference) between measurement data and reference data, for the current in the motor 30 that is obtained during the opening or closing of the door 80 in the diagnostic mode, is relatively greater than a predetermined criterion over the entire steady state period of the door 80, the diagnostic system SYS can estimate that the shortage of grease or fouling at the door rail occurs.

For example, when an average magnitude of the current during the steady state period in which the door 80 is opened or closed in the diagnostic mode is greater than a threshold Th1, the diagnostic system SYS estimates that a shortage of grease or fouling at the door rail occurs. The threshold Th1 is a value greater than 0 (zero), and is set to a value somewhat greater than an average of the reference data that is defined during the same period as the above steady state period.

Second Example

Figure 10:
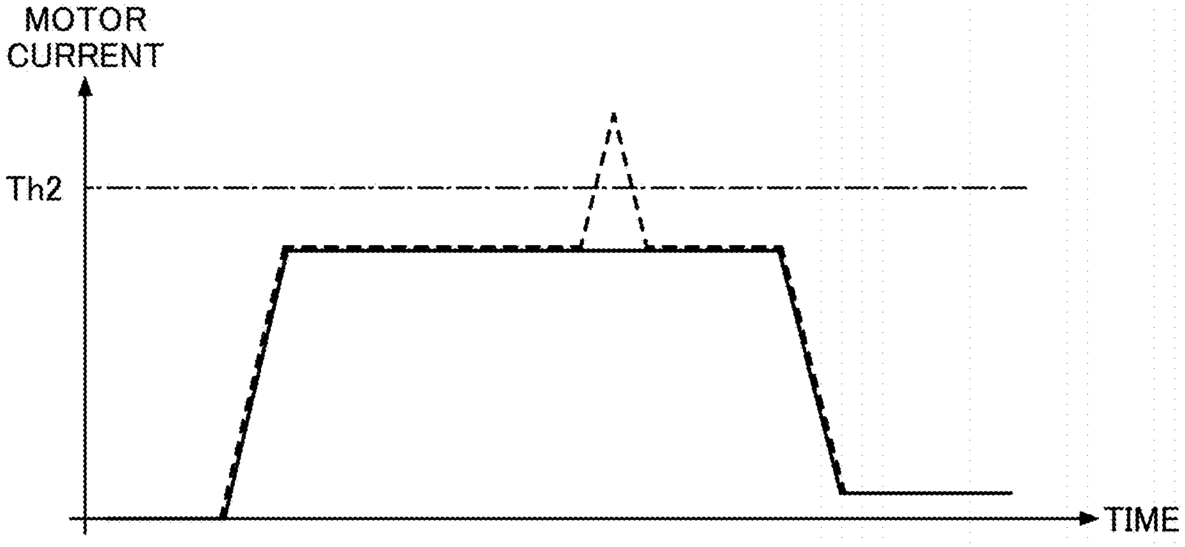
FIG. 10 is a diagram schematically illustrating a second example of the motor current during opening and closing of the door, in the case where the abnormality in the traveling resistance of the door occurs.

FIG. 10 is a diagram schematically illustrating a second example of the current in the motor 30 during opening and closing of the door 80, in a case where an abnormality in the traveling resistance of the door 80 occurs. Specifically, FIG. 10 is a diagram schematically illustrating a specific example (broken line) of the time series current in the motor 30 during opening or closing of the door 80, in a case where the abnormality in the traveling resistance of the door 80 occurs due to intrusion of foreign matter into the door rail or due to deformation (distortion) in the door rail. In addition, FIG. 10 illustrates time-series data (solid line) schematically indicating the current in the motor 30 during opening and closing of the door 80, in a case where the door 80 is in a normal state.

As illustrated in FIG. 10, when the intrusion of foreign matter into the door rail or distortion (deformation) in the door rail occurs, a difference between the current in the motor 30 that flows during opening or closing of the door 80, and the current in the normal state tends to be locally relatively increased during the steady state period of the door 80. This is because there are cases where the intrusion of the foreign matter into the door rail or the distortion (deformation) in the door rail often occurs at a local portion of the door rail. For this reason, when a state in which a mismatch (difference) between the measurement data and the reference data, for the current in the motor 30 flowing during at least one of opening or closing of the door 80 in the diagnostic mode, is relatively greater than a predetermined criterion, is held within a local portion of the steady state period of the door 80, the diagnostic system SYS can estimate that the intrusion of the foreign matter into the door rail or distortion (deformation) of the door rail occurs. In addition, the diagnostic system SYS compares measurement data of the current in the diagnostic mode in which the door 80 is opened or closed, with measurement data of a position of the door 80, and thereby can estimate a location where intrusion of the foreign matter into the door rail or distortion (deformation) in the door rail occurs. The measurement data of the position of the door 80 is acquired based on the output of the encoder 31.

For example, when the current in the motor 30 in diagnostic mode in which the door 80 is opened or closed during a steady state period is locally greater than a threshold Th2, the diagnostic system SYS estimates that intrusion of foreign matter into the door rail or distortion in the door rail occurs. The threshold Th2 is a value greater than 0 (zero), and is set to a value greater than the threshold Th1, for example. This is because it is assumed that a locally increased traveling resistance, caused by the intrusion of the foreign matter into the door rail or distortion in the door rail, is greater than an increased traveling resistance, in the entire door rail, caused by a shortage of grease or fouling at the door rail.

In addition, the diagnostic system SYS may estimate the intrusion of the foreign matter into the door rail and the distortion (deformation) of the door rail, separately. In this case, opening or closing of the door 80 in the diagnostic mode is performed a plurality of times, and a plurality of pieces of measurement data that are obtained each time the opening or closing is performed are used, where each measurement data indicates the current in the motor 30 and the position of the door 80. In this case, all of the measurement data may be measurement data obtained during the opening of the door 80, or may be measurement data obtained during the closing of the door 80. In addition, a combination of measurement data that is obtained during the opening of the door 80 and measurement data that is obtained during the closing of the door 80 may be included in multiple pieces of measurement data.

For example, with use of a plurality of pieces of measurement data, the diagnostic system SYS estimates that distortion in the door rail occurs when locations where abnormalities in the door rail occur are collected within a relatively narrow predetermined range in the entire operating section between the fully closed position and the fully opened position of the door 80. In contrast, with use of a plurality of pieces of measurement data, the diagnostic system SYS may estimate that intrusion of the foreign matter into the door rail occurs when locations where abnormalities occur in the door rail deviate from the relatively narrow predetermined range in the entire operating interval between the fully closed position and the fully opened position of the door 80. This is because there is a high possibility that a portion at which the door rail distorts is fixed and, a portion of the door rail into which the foreign matter has intruded moves by opening or closing of the door 80.

Third Example

Figure 11:
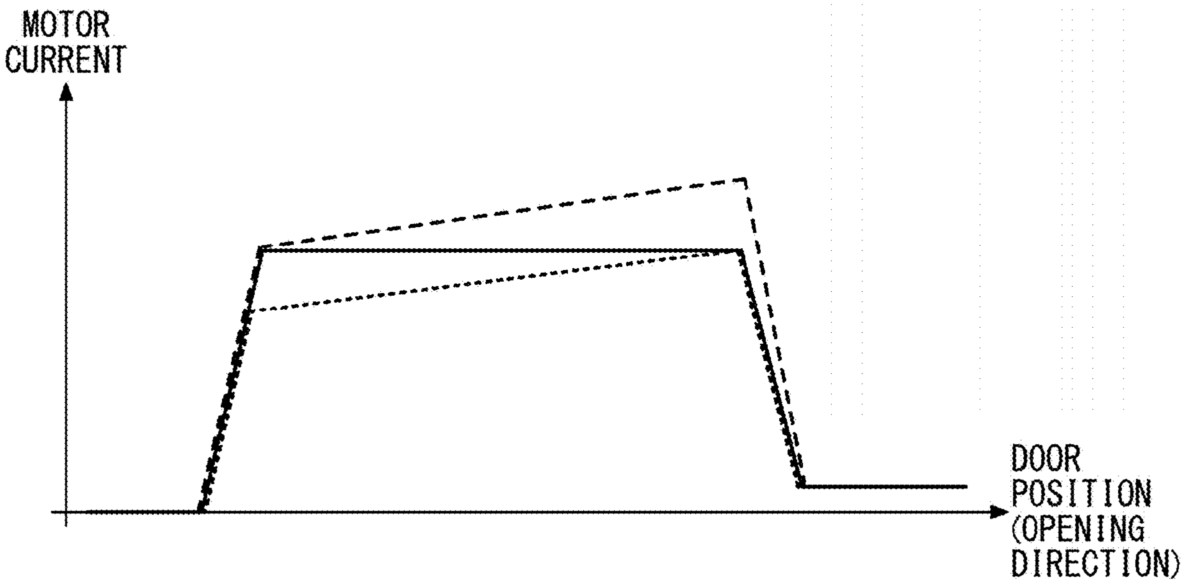
FIGS. 11 and 12 are diagrams schematically illustrating a third example of the motor current during opening and closing of the door, in the case where the abnormality in the traveling resistance of the door occurs.
Figure 12:
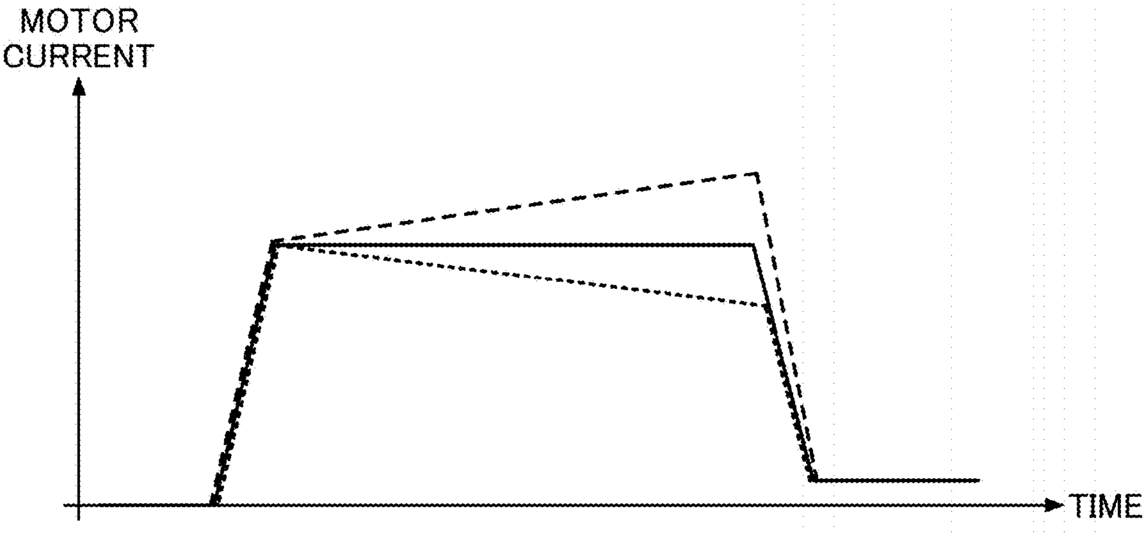

FIGS. 11 and 12 are diagrams schematically illustrating a third example of the current in the motor 30 during opening and closing of the door 80, in a case where an abnormality in the traveling resistance of the door 80 occurs. Specifically, FIG. 11 is a diagram illustrating the relationship between the current in the motor 30 and the position of the door 80, during opening (broken line) and closing (dotted line) of the door 80, in a case where the abnormality in the traveling resistance of the door 80 occurs due to changes in a tilt state of the door rail relative to the front-and-back direction. FIG. 12 is a diagram schematically illustrating a specific example of time series currents in the motor 30 during opening (broken line) and closing (dotted line) of the door 80, in a case where the abnormality in the traveling resistance of the door 80 occurs due to changes in the tilt state of the door rail relative to the front-and-back direction. In addition, FIGS. 11 and 12 illustrate data (solid line) schematically indicating the current in the motor 30 during the opening or closing of the door 80, under the normal condition of the door 80. In this example, under the normal condition, the door rail is provided so as to extend along the front-and-back direction of the train carriage, and under the abnormal condition, the door rail is inclined upward with respect to an opening direction in which the door panels 80A and 80B are moved.

As illustrated in FIGS. 11 and 12, when the tilt state of the door rail relative to the front-and-back direction changes, the current in the motor 30 during opening or closing of the door 80 changes such that a deviation from the current under the normal condition increases from one end to the other end, of an operating section, or a time period, corresponding to the steady state of the door 80. With this arrangement, the diagnostic system SYS can estimate that changes in the tilt state of the door rail relative to the front-and-back direction occur, when a mismatch (difference) between measurement data and reference data, for the current in the motor 30 in the diagnostic mode in which the door 80 is opened or closed, is increased from one end (starting point) to the other end (end point) of the operating section, or a time period for the door 80, corresponding to the steady state of the door 80, and the difference is reached in a state of being relatively greater than a predetermined criterion.

For example, the diagnostic system SYS estimates that changes in the tilt state of the door rail relative to the front-and-back direction occur, when the difference between current magnitudes that are obtained at one end and the other end of an operating section, or a time period, corresponding to the steady state in which the door 80 is opened or closed in the diagnostic mode, is relatively greater than a threshold Th31. The threshold Th31 is a value greater than 0 (zero), and is set to a value that is sufficiently greater than the extent to which a value is changeable at the steady state under the normal condition of the door 80.

Further, as illustrated in FIG. 11, when the tilt state of the door rail relative to the front-and-back direction changes, the current that flows in the steady state in which the door 80 moves in an opening direction in an operating section is increased, in comparison to the normal condition. Likewise, as illustrated in FIG. 12, the time series current that flows in the steady state in which the door 80 is opened is increased, in comparison to the normal condition. This is because an upward tilt of the door rail during opening of the door 80 is increased in comparison to the normal condition. In contrast, as illustrated in FIG. 11, the current that flows in the steady state in which the door 80 moves in a closed direction in an operating section is decreased, in comparison to the normal condition. Likewise, as illustrated in FIG. 12, the time series current that flows in the steady state in which the door 80 is closed is decreased, in comparison to the normal condition. This is because, contrary to the opening of the door 80, downward tilt of the door rail during the closing of the door 80 is increased in comparison to the normal condition. With this arrangement, when a difference between currents that flow in the diagnostic mode in which the door 80 is opened and closed at the same position of the door 80 is sufficiently increased in comparison to the normal condition, the diagnostic system SYS can estimate that changes in the tilt state of the door rail relative to the front-and-back direction occur. When a difference between pieces of time-series measurement data of currents that flow in the diagnostic mode in which the motor 30 is opened and closed is increased, and thus the difference is reached in a state of being relatively greater than a predetermined criterion, the diagnostic system SYS can estimate that changes in the tilt state of the door rail relative to the front-and-back direction occur.

For example, the diagnostic system SYS estimates that changes in the tilt state of the door rail relative to the front-and-back direction occur, when a difference between currents that flow in the diagnostic mode in which the door 80 is opened and closed by moving in an entirety, or a portion, of the operating section, is relatively greater than a threshold Th32. The threshold Th32 is a value greater than 0 (zero), and is set to a value sufficiently greater than an extent to which there can be a difference between currents in the motor 30 that flow under the normal condition in which the door 80 is opened and closed by moving in an operating section corresponding to the steady state of the door 80. The diagnostic system SYS estimates that changes in the tilt state of the door rail relative to the front-and-back direction occur, when a difference between current magnitudes that are obtained during respective steady state periods, in which the door 80 is opened and closed in the diagnostic mode, is varied over time to be greater than a threshold Th33. The threshold Th33 is a value greater than 0 (zero), and is set to a value sufficiently greater than an extent to which there may be a difference between currents in the motor 30 under the normal condition in which the door 80 is opened and closed during a steady state period of the door 80.

First Example Related to Abnormality Diagnosis Process for Door

Hereinafter, a first example related to an abnormality diagnosis process for the door 80 will be described with reference to FIG. 13.

Figure 13:
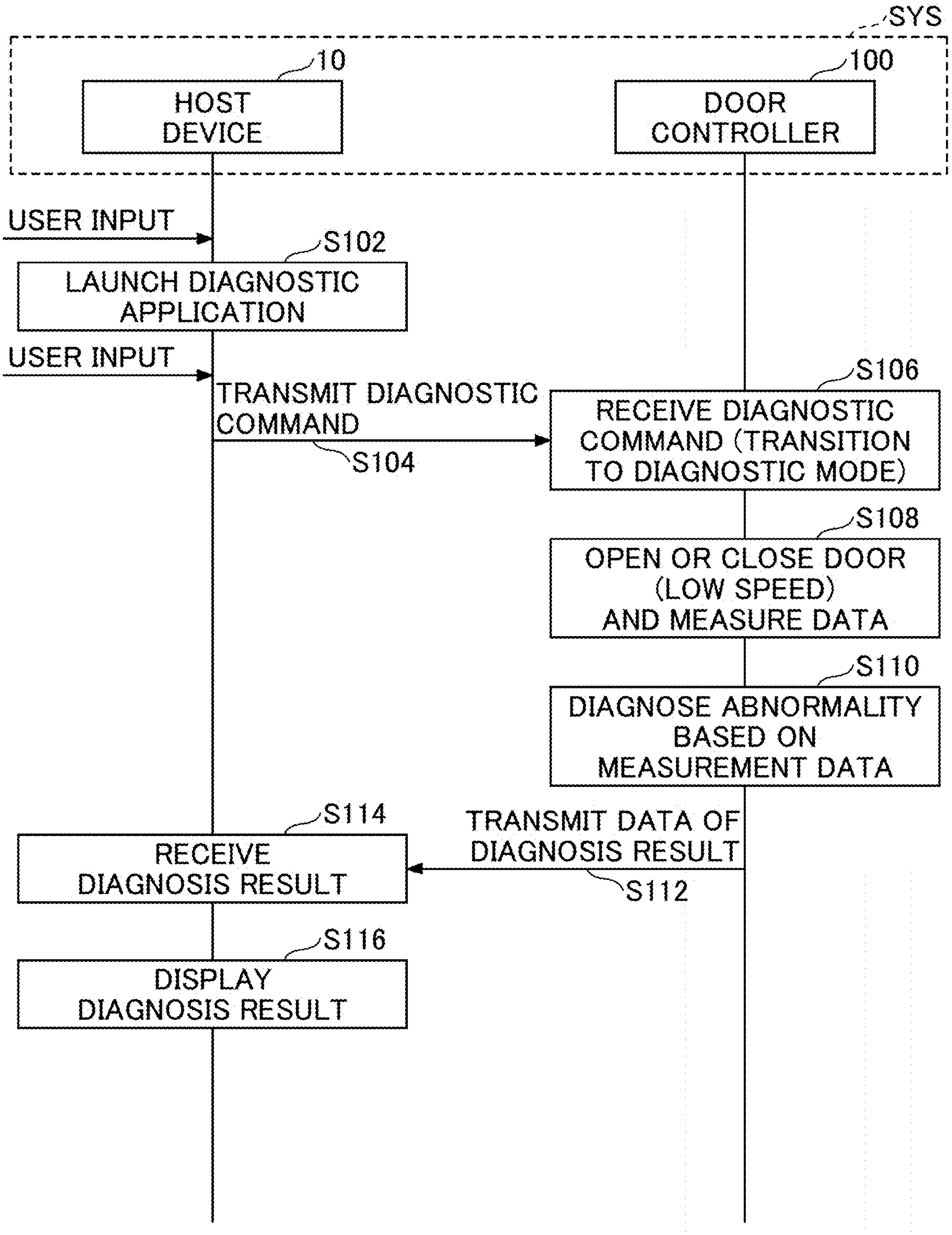
FIG. 13 is a sequence diagram illustrating a first example of an abnormality diagnosis process for the door.

FIG. 13 is a sequence diagram illustrating the first example related to the abnormality diagnosis process for the door 80.

In this example, the diagnostic system SYS is provided in the train carriage 1, and includes a host device 10 and a door controller 100.

In this example, a case where in the door controller 100, the normal controller 110, among the normal controller 110 and the backup controller 120, performs the control for the door 80.

As illustrated in FIG. 13, the carriage controller 12 of the host device 10 launches an application program (hereinafter referred to as a "diagnostic application") related to the abnormality diagnosis for the door 80, in response to receiving a predetermined input from a user, such as a crew in a driver's room or a conductor's room (step S102).

After the process in step S102 is completed, the carriage controller 12 transmits a diagnostic command to the door controller 100 via the transmission device 16, in response to receiving a predetermined input from the user to request to start the abnormality diagnosis for the door 80 (step S104).

The diagnostic command may be used to diagnose an abnormality in all doors 80 of the train carriage 1, or may be used to diagnose the abnormality in only a portion of all the doors 80 of the train carriage 1. In the latter case, the portion of all the doors 80 on which the abnormality diagnosis is to be performed is designated by an input from the user, and the diagnostic command is transmitted to only one or more door controllers 100 that control one or more doors 80 on which the abnormality diagnosis is to be performed.

The input signal detector 113 of the door controller 100 receives the diagnostic command transmitted in the process in step S104, through the communication unit 112, and the motor controller 115 of the door controller 100 shifts a control mode for the door 80 to the diagnostic mode (step S106).

When the process in step S106 is completed, the motor controller 115 opens and/or closes the door 80 in the diagnostic mode, and the input signal detector 113 measures data that is obtained during opening and/or closing of the door 80 (step S108). The opening and/or closing of the door 80 in the diagnostic mode means that the door 80 is opened and/or closed at a constant speed V2. As described above, the motor controller 115 may only open the door 80, may only close the door 80, and may open and close the door 80. As described above, data to be measured is data indicative of the current in the motor 30, data indicative of the speed of the door 80, and data indicative of the position of the door 80, where each data is measured during opening and closing of the door 80.

When the process in step S108 is completed, the input signal detector 113 performs abnormality diagnosis for the door 80, based on measurement data obtained in step S108 (step S110).

When the process in step S110 is completed, the input signal detector 113 transmits data indicative of a result of the abnormality diagnosis for the door 80 in step S110, to the host device 10 through the communication unit 112 (step S112).

The carriage controller 12 of the host device 10 receives the data transmitted in the process in step S112, through the transmission device 16, where the data indicates the result of the abnormality diagnosis for the door 80 (step S114).

When the process in step S114 is completed, the carriage controller 12 displays the result of the abnormality diagnosis for the door 80, on a display device in a driver's room or a conductor's room, for example (step S116).

With this arrangement, a user such as a crew in a driver's room or a conductor's room can check the result of the abnormality diagnosis for the door 80.

As described above, in this example of the diagnostic system SYS, in response to receiving a request that is input from the user through the host device 10, the door controller 100 acquires data in the diagnostic mode in which the door 80 is opened and/or closed, and subsequently performs abnormality diagnosis for the door 80. Then, in the diagnostic system SYS, the door controller 100 transmits the data that indicates the result of the abnormality diagnosis for the door 80, to the host device 10, and finally provides the result of the abnormality diagnosis for the door 80 to the user, by using the host device 10.

As a result, in the driver's room or the conductor's room, the user can check the result of abnormality diagnosis for all the doors 80 of the train carriage 1. An amount of data that is communicated between the host device 10 and the door controller 100 is relatively smaller than an amount of measurement data that is obtained during opening and/or closing of the door 80, such as diagnostic command data, or data indicative of a result of abnormality diagnosis. For this reason, the amount of data that is communicated between the host device 10 and the door controller 100 can be suppressed to be relatively small.

In proximity to a target door 80 of the train carriage 1 on which abnormality diagnosis is performed, a request for abnormality diagnosis is input from the user, and thus a result of the abnormality diagnosis may be provided to the user. For example, in the door controller 100 provided in a car body that is at a space above the door 80, the door controller 100 may include an input device that receives an input of a user's request for abnormality diagnosis, and may include a notification device (for example, an indicator or the like) that notifies the user of the result of abnormality diagnosis. With this arrangement, for example, a user such as an inspection worker enables abnormality diagnosis for each door 80, and then the user can check a result of the abnormality diagnosis for the door 80, at a place where the door 80 is installed. In addition, because there is no need to communicate data relating to abnormality diagnosis for the door 80, between the host device 10 and the door controller 100, an amount of data that is communicated between the host device 10 and the door controller 100 can be further suppressed.

Second Example of Abnormality Diagnosis Process for Door

Hereinafter, a second example of the abnormality diagnosis process for the door 80 will be described with reference to FIG. 14.

Figure 14:
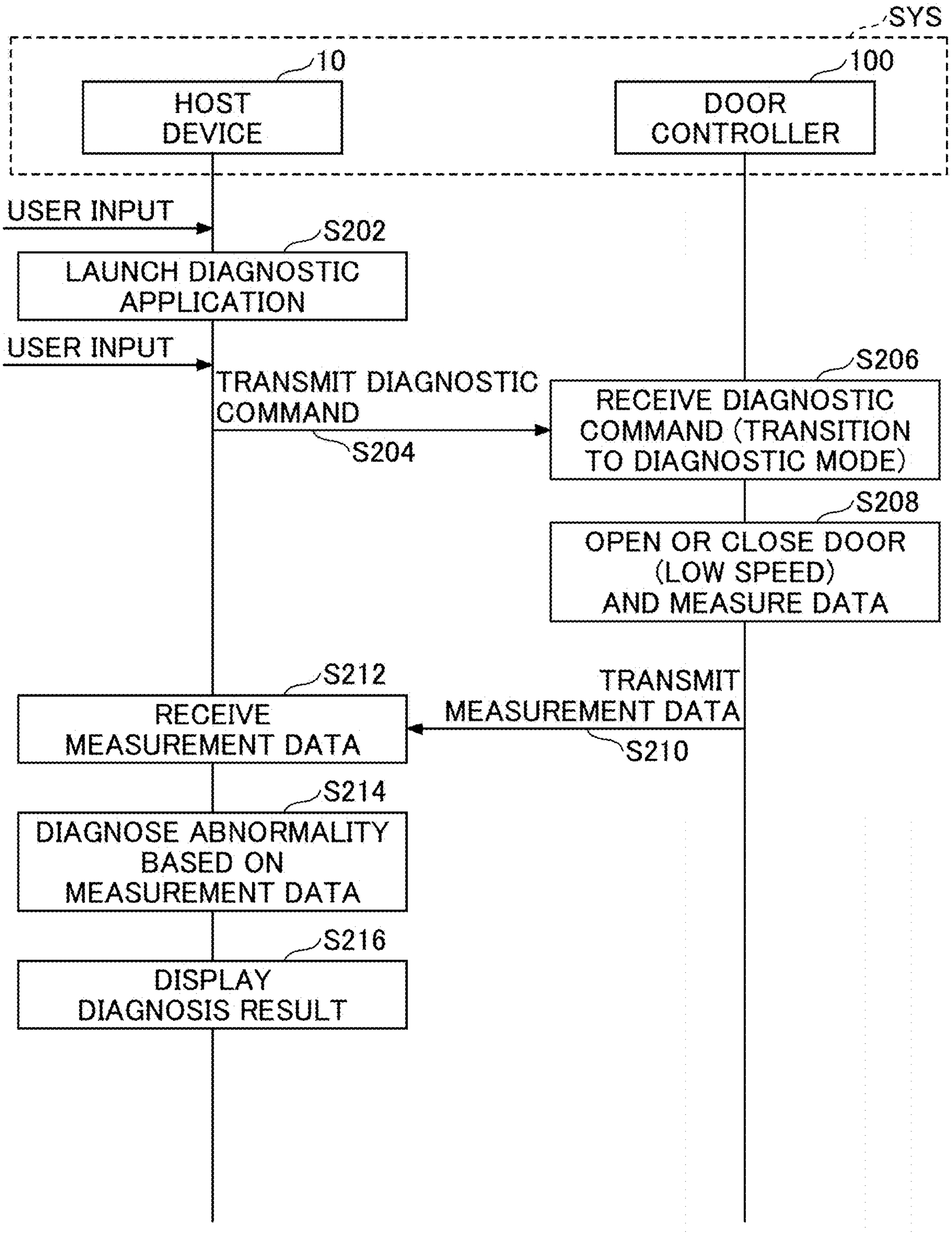
FIG. 14 is a sequence diagram illustrating a second example of the abnormality diagnosis process for the door.

FIG. 14 is a sequence diagram illustrating the second example of the abnormality diagnosis process for the door 80.

In this example, as in the above first example, the diagnostic system SYS is provided in the train carriage 1, and includes the host device 10 and the door controller 100.

As illustrated in FIG. 14, steps S202, S204, S206, and S208 are the same as steps S102, S104, S106, and S108 in FIG. 13 described above, and accordingly description thereof is omitted.

When the process in step S208 is completed, the input signal detector 113 transmits measurement data that is obtained in step S208 to the host device 10, through the communication unit 112 (step S210).

In step S212, the carriage controller 12 of the host device 10 receives the measurement data transmitted from the door controller 100 in step S210, through the transmission device 16 (step S212).

When the process in step S212 is completed, the carriage controller 12 performs abnormality diagnosis for the door 80, based on the measurement data received in step S212 (step S214).

When the process in step S214 is completed, as in step S116 in FIG. 13 described above, the carriage controller 12 displays the result of the abnormality diagnosis for the door 80, on the display device in a driver's room or a conductor's room, for example (step S216).

As described above, in this example of the diagnostic system SYS, the door controller 100 acquires data in the diagnostic mode in which the door 80 is opened and/or closed, and then transmits the acquired data to the host device 10. Subsequently, in the diagnostic system SYS, the host device 10 performs abnormality diagnosis for the door 80, based on the data acquired from the door controller 100.

With this arrangement, in this example of the diagnostic system SYS, the host device 10 can acquire measurement data for all the doors 80 of the train carriage 1, and the host device 10 can sequentially accumulate measurement data for each door 80, each time abnormality diagnosis for the doors 80 is performed. This is because it is easy to secure a sufficiently large storage resource of the host device 10, in comparison to a storage resource of the door controller 100. Thus, the carriage controller 12 can analyze abnormalities of one or more doors 80, based on a measurement data group that is acquired during opening and/or closing of all the doors 80 of the train carriage 1, where the measurement data group is accumulated in the host device 10. For example, the carriage controller 12 may analyze a history of the measurement data that is acquired during the opening and/or closing of a specific door 80. In this case, the diagnostic system SYS can predict a deterioration state (sign of abnormality) of the door 80, based on a result of the analysis at the carriage controller 12. As a result, the diagnostic system SYS can diagnose the presence or absence of the abnormality in the door 80, in addition to diagnosing the presence or absence of a given sign of the abnormality in the door 80. Thus, the diagnostic system SYS can more appropriately perform abnormality diagnosis for the door 80.

Another Example of Diagnostic System

Hereinafter, another example of the diagnostic system SYS will be described with reference to FIG. 15.

Figure 15:
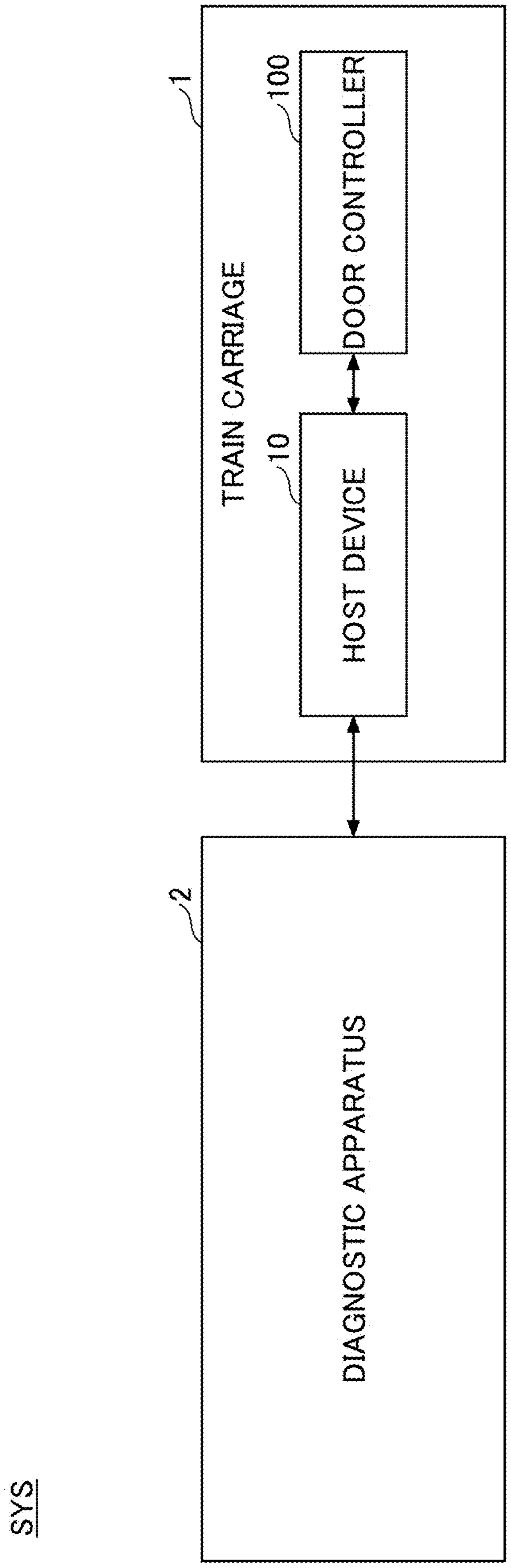
FIG. 15 is a diagram illustrating another example of a diagnostic system.

FIG. 15 is a diagram illustrating another example of the diagnostic system SYS.

As illustrated in FIG. 15, the diagnostic system SYS includes the train carriage 1 (the host device 10 and the door controller 100) and a diagnostic apparatus 2.

In this example, the train carriage 1 included in the diagnostic system SYS may have one car or a plurality of cars. The same condition may apply to a fourth example (FIG. 17) described below.

The diagnostic apparatus 2 performs abnormality diagnosis for the door 80 in the train carriage 1.

The diagnostic apparatus 2 is provided outside the train carriage 1. The diagnostic apparatus 2 is communicably coupled to the train carriage 1 through a predetermined communication line.

The predetermined communication line includes, for example, a wide area network (WAN), such as a mobile communication network of which an end point is a base station, or a satellite communication network using one or more communication satellites. In addition, the predetermined communication line may include, for example, a local network that is provided at a station, a rail yard, or the like. The predetermined communication line may include, for example, a short-range communication line based on a predetermined communication standard, such as Bluetooth (registered trademark) or WiFi.

The diagnostic apparatus 2 is a server device having relatively high processing capability. The server device may include an on-premise server, a cloud server, or an edge server. In addition, the diagnostic apparatus 2 may include a terminal device that has relatively lower processing capability compared to a server device. The terminal device may be, for example, a stationary terminal device such as a desktop personal computer (PC), or may be, for example, a portable terminal device (mobile terminal) such as a smartphone, a tablet terminal, or a laptop computer.

A function of the diagnostic apparatus 2 may be implemented by any hardware or any combination of hardware and software. For example, the diagnostic apparatus 2 is mainly implemented by a computer that includes a CPU, a memory device, an auxiliary storage device, and an interface device. The memory device is, for example, an SRAM or a dynamic random access memory (DRAM). The auxiliary storage device is, for example, a hard disc drive (HDD), a solid state drive (SSD), an electrically erasable programmable read-only memory (EEPROM), or a flash memory. The interface device includes, for example, a communication interface for communicating with an external device that includes the train carriage 1 (host device 10). The interface device also includes an external interface for coupling an external recording medium. As a result, a program and various types of data that are used to execute an abnormality diagnosis process for the door 80 can be installed from the recording medium to be stored in the auxiliary storage device or the like of the diagnostic apparatus 2. In addition, the program and various types of data that are used to execute the abnormality diagnosis process for the door 80 may be downloaded from the outside of the diagnostic apparatus 2, through the communication interface. The interface device may include a combination of different types of interface devices, in light of types of communication lines to be coupled. The diagnostic apparatus 2 may further include an input device for receiving various inputs from the user, and may include an output device for outputting information to the user. The input device includes, for example, a mechanical-operation input device, such as a mouse, a keyboard, or a touch panel, that receives a mechanical input from the user. The input device may include, for example, a gesture input device or a voice input device that is capable of receiving a user's input through a gesture or a voice, where a camera, a microphone, or the like is used to detect the gesture or the voice. The output device includes, for example, a display device that visually outputs information, and includes a sound output device that audibly outputs information. The display device includes, for example, a liquid crystal display or an organic electroluminescence (EL) display. The sound output device is, for example, a speaker.

Third Example Related to Abnormality Diagnosis Process for Door

Figure 16:
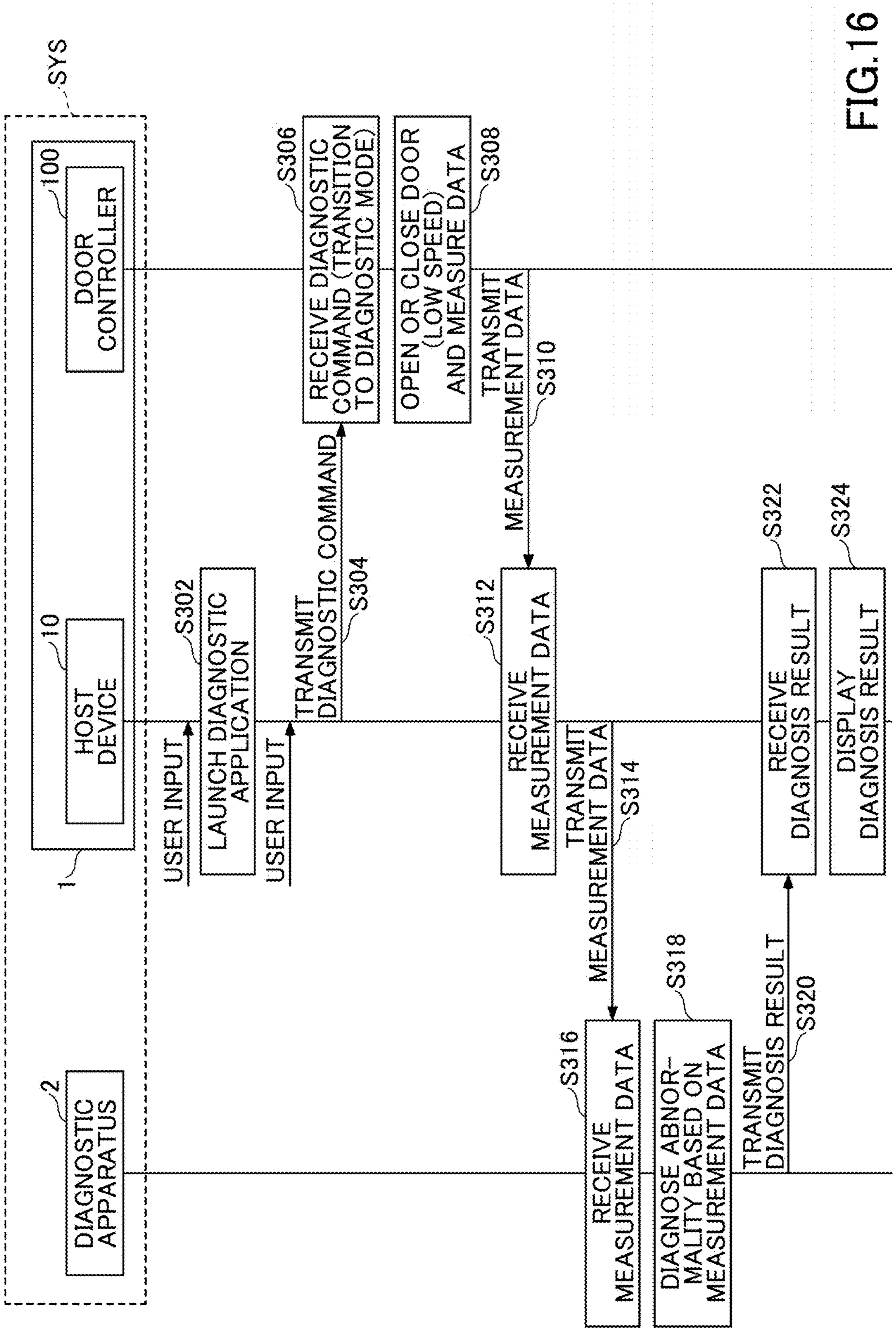
FIG. 16 is a sequence diagram illustrating a third example of the abnormality diagnosis process for the door.

Hereinafter, a third example of the abnormality diagnosis process for the door 80 will be described with reference to FIG. 16, FIG. 16 is a sequence diagram illustrating the third example of the abnormality diagnosis process for the door 80.

In this example, the diagnostic system SYS in FIG. 15 described above is used.

As illustrated in FIG. 16, steps S302, S304, S306, S308, S310, and S312 are the same as the steps S202, S204, S206, S208, S210, and S212 illustrated in FIG. 14 above, and accordingly description thereof is omitted.

The carriage controller 12 of the host device 10 transmits measurement data that is received in step S312, to the diagnostic apparatus 2 that is situated outside the train carriage 1 (step S314).

The diagnostic apparatus 2 receives the measurement data transmitted from the host device 10 of the train carriage 1 in step S314 (step S316).

The diagnostic apparatus 2 performs abnormality diagnosis for the door 80, based on the measurement data received in step S316 (step S318).

When the process in step S318 is completed, the diagnostic apparatus 2 transmits a result of the abnormality diagnosis of the door 80, to the host device 10 of the train carriage 1 (step S320).

The carriage controller 12 of the host device 10 receives the result of the abnormality diagnosis for the door 80, where the result is transmitted from the diagnostic apparatus 2 in the process in step S320 (step S322).

When the process in step S322 is completed, the carriage controller 12 displays the result of the abnormality diagnosis for the door 80, on a display device that is in a driver's room or a conductor's room, for example, as in steps S116 and S216 in FIGS. 13 and 14 described above (step S324).

As described above, in this example of the diagnostic system SYS, the diagnostic apparatus 2 that is situated outside the train carriage 1 can perform abnormality diagnosis for the door 80. With this arrangement, a processing load for the train carriage 1 (the host device 10 and the door controller 100), which typically has a relatively small processing resource, can be reduced.

In addition, in this example of the diagnostic system SYS, measurement data for each of doors 80 in train carriages 1 having a plurality cars can be acquired, and the measurement data can be accumulated for each of the doors 80 on which an abnormality diagnosis process is performed. As a result, the diagnostic apparatus 2 can analyze the abnormality in the doors 80, based on a measurement data group that is accumulated during the opening and closing of the doors 80 in the train carriages 1 having the plurality of cars. As a result, the diagnostic apparatus 2 can analyze the abnormality in all of the doors 80, based on a measurement data group that is acquired during the opening and closing of the doors 80 in a target train carriage 1, where the measurement data group is accumulated in the diagnostic apparatus 2. For example, the diagnostic apparatus 2 may analyze a history of the measurement data that is acquired during the opening and closing of a specific door 80. With this arrangement, the diagnostic system SYS can predict a deterioration state (a sign of the abnormality) of the door 80, based on an analysis result that is obtained at the diagnostic apparatus 2, to thereby diagnose the presence or absence of the abnormality of the sign of an abnormality in the door 80, as well as diagnosing the presence or absence of the abnormality in the door 80. In addition, in the diagnostic apparatus 2, machine learning, such as clustering, is adopted based on measurement data for doors 80 in all cars in the train carriages 1, and thus one or more abnormal doors 80, or one or more doors 80 having signs of the abnormalities may be extracted from all the doors 80 in train carriages 1. In such a manner, instead of, or in addition of the abnormality diagnosis process, the diagnostic system SYS can perform abnormality diagnosis for one or more doors 80, by adopting machine learning. Thus, the diagnostic system SYS can more appropriately perform the abnormality diagnosis for the door 80.

A diagnostic application may be installed in the diagnostic apparatus 2. The diagnostic apparatus 2 may transmit a diagnostic command to the train carriage 1 (host device 10), in response to receiving a predetermined input from a user at the diagnostic apparatus 2. When the diagnostic system SYS includes train carriages 1 having a plurality of cars, the diagnostic command is transmitted to a specific train carriage 1 that is designated through a predetermined input from the user.

Still Another Example of Diagnostic System

Hereinafter, still another example of the diagnostic system SYS will be described with reference to FIG. 17.

Figure 17:
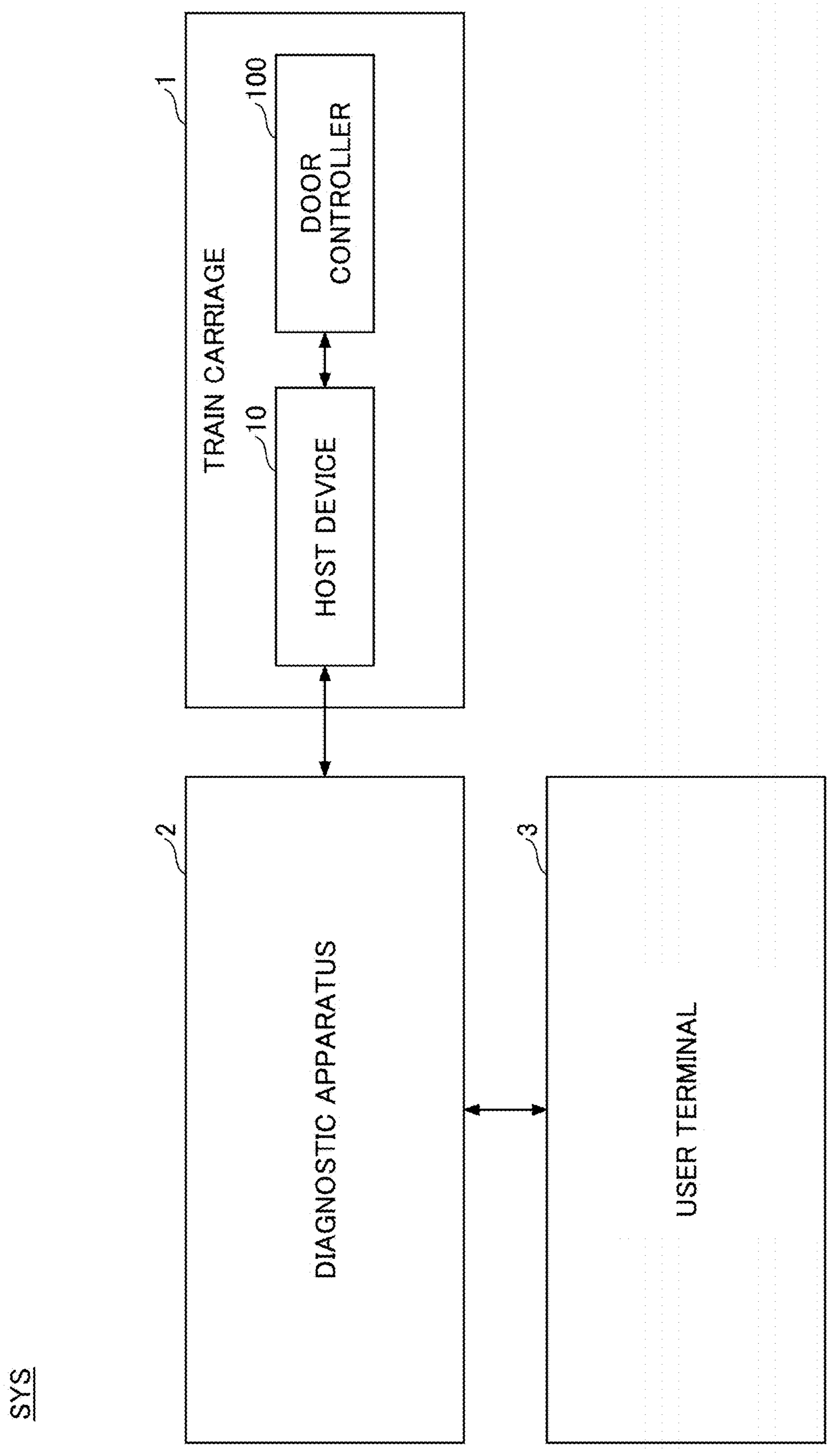
FIG. 17 is a diagram illustrating still another example of the diagnostic system.

FIG. 17 is a diagram illustrating still another example of the diagnostic system SYS.

As illustrated in FIG. 17, the diagnostic system SYS includes the train carriage 1 (the host device 10 and the door controller 100) and the diagnostic apparatus 2, as in the other example (FIG. 15) described above. The diagnostic system SYS also includes a user terminal 3, unlike the other example (FIG. 15).

The user terminal 3 is a terminal device that the user of the diagnostic system SYS uses.

The user terminal 3 is a terminal device that is used, for example, by an inspector who inspects one or more doors 80, or a person or like that is responsible for maintenance and inspection for the train carriage 1. The user terminal 3 may be, for example, a terminal device that the user for the diagnostic apparatus 2 uses.

The user terminal 3 may be, for example, a stationary terminal device such as a desktop personal computer (PC), or may be, for example, a portable terminal device (mobile terminal) such as a smartphone, a tablet terminal, or a laptop PC.

A function of the user terminal 3 may be implemented by any hardware or any combination of hardware and software. For example, the user terminal 3 is mainly implemented by a computer that includes a CPU, a memory device, an auxiliary storage device, an interface device, an input device, and an output device. The memory device includes, for example, an SRAM or a dynamic random access memory (DRAM). The auxiliary storage device includes, for example, an HDD, an SSD, an EEPROM, a flash memory, or the like. The interface device includes, for example, a communication interface for communicating with an external device that includes the diagnostic apparatus 2. The interface device also includes an external interface for coupling an external recording medium. As a result, a program and various data that are used to execute an abnormality diagnosis process for the door 80 can be installed from the recording medium to be stored in the auxiliary storage device or the like of the user terminal 3. In addition, the program and various data that are used to execute the abnormality diagnosis process for the door 80 may be downloaded from the outside of the user terminal 3, through the communication interface. Further, the interface device may include different types of interface devices, in light of the types of communication lines to be coupled. The input device includes, for example, a mechanical-operation input device such as a mouse, a keyboard, or a touch panel that receives a mechanical input from a user. The input device may include, for example, a gesture input device or a voice input device that is capable of receiving an input by a gesture or voice from a user by a camera, a microphone, or the like. The output device includes, for example, a display device that visually outputs information and a sound output device that audibly outputs information. The display device is, for example, a liquid crystal display or an organic electroluminescence (EL) display. The sound output device includes, for example, a speaker.

Fourth Example of Abnormality Diagnosis Process for Door

Hereinafter, a fourth example of the abnormality diagnosis process for the door 80 will be described with reference to FIG. 18.

Figure 18:
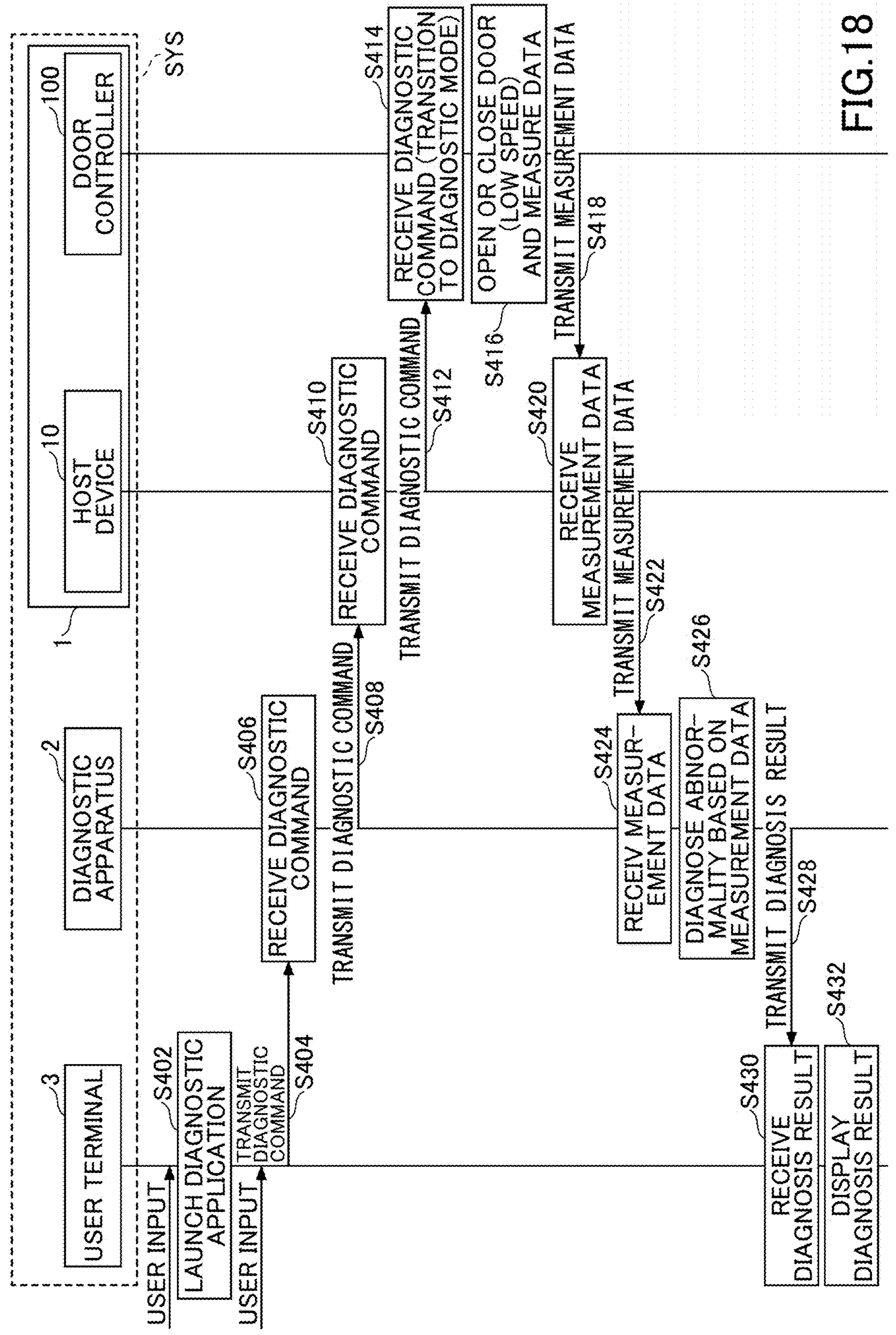
FIG. 18 is a sequence diagram illustrating a fourth example of the abnormality diagnosis process for the door.

FIG. 18 is a sequence diagram illustrating the fourth example of the abnormality diagnosis process for the door 80.

In this example, the diagnostic system SYS illustrated in FIG. 17 is used.

As illustrated in FIG. 18, the user terminal 3 launches a diagnostic application, in response to receiving a predetermined input from the user (step S402).

After the process in step S402 is completed, the user terminal 3 transmits a diagnostic command to the diagnostic apparatus 2, in response to receiving a predetermined input of a request from the user to perform abnormality diagnosis for the door 80 (step S404).

The diagnostic command transmitted from the user terminal 3, which is used at train carriages 1 having a plurality of cars, specifies a target train carriage 1 for which abnormality diagnosis is performed on one or more doors 80. The target train carriage 1 is specified using a predetermined input from the user.

The diagnostic apparatus 2 receives the diagnostic command transmitted from the user terminal 3 in the process in step S404 (step S406).

When the process in step S406 is completed, the diagnostic apparatus 2 relays the diagnostic command from the user terminal 3 to transmit the diagnostic command to the target train carriage 1 (the host device 10) (step S408).

The host device 10 (carriage controller 12) in the target train carriage 1 receives the diagnostic command transmitted in step S408 (step S410).

The carriage controller 12 relays the diagnostic command received in step S408 to transmit the diagnostic command to the door controller 100 via the transmission device 16 (step S412).

Steps S414, S416, S418, S420, S422, S424, and S426 are the same as steps S306, S308, S310, S312, S314, S316, and S318 in the third example (FIG. 16) described above, and description thereof is omitted.

When the process in step S426 is completed, the diagnostic apparatus 2 transmits a result of the abnormality diagnostic for the door 80 in step S426, to the user terminal 3 (step S428).

The user terminal 3 receives the result of the abnormality diagnostic transmitted from the diagnostic apparatus 2 in step S428 (step S430).

When the process in step S430 is completed, the user terminal 3 displays the result of the abnormality diagnosis for the door 80, on an output device (display device) of the user terminal 3 (step S432).

With this arrangement, the user can check the result of the abnormality diagnosis for the door 80, by using the user terminal 3.

As described above, in this example, in the diagnostic system SYS, the user terminal 3 transmits a request (diagnostic command) to perform abnormality diagnosis for the door 80, to the train carriage 1 through the diagnostic apparatus 2, and then the user terminal 3 notifies the user of the result of the abnormality diagnosis for the door 80.

With this arrangement, with use of the user terminal 3, the user for the diagnostic system SYS can request a result of abnormality diagnosis for the door 80 to check the result of the abnormality diagnosis for the door 80. Therefore, for example, a user other than the user who can directly use the train carriage 1 or the diagnostic apparatus 2 can check the result of the abnormality diagnosis, by using the user terminal 3. For example, a person in charge of a manufacturer who handles service parts of one or more doors 80 can recognize a situation in which an abnormality occurs in one or more doors 80 for each car of the train carriage 1, and then optimize management or the like for the service parts. For example, a person who maintains and inspects one or more train carriages 1 can carry the user terminal 3, performs maintenance and inspection work for one or more doors 80 of an actually used train carriage 1, while checking the result of the abnormality diagnosis of each door 80. Therefore, convenience of the user for the diagnostic system SYS can be improved.

Operation

Hereinafter, the operation of the diagnostic apparatus according to the present embodiment will be described.

In the present embodiment, when a motor drives a door in at least one of a case where the door of a train carriage is opened at a second speed that is lower than a first speed at which a passenger gets on and off a given train carriage, or a case where the door is closed at the second speed, a diagnostic apparatus acquires data (drive data) for a motor configured to drive the door, the acquired data being related to the driving of the door. The diagnostic apparatus may include, for example, the door controller 100, the carriage controller 12, or the diagnostic apparatus 2 described above. The train carriage is, for example, the above train carriage 1. The first speed is, for example, the speed V1 described above. The second speed is, for example, the speed V2 described above. The door is, for example, the door 80 described above. The electric motor is, for example, the motor 30 described above. The data relating to the driven door may include, for example, data relating to the current of the motor 30, data relating to the drive torque of the motor 30 that is used as a rotating machine, data relating to the propulsion of the motor 30 that is used as a linear motor, and data relating to the speed of the motor 30. Then, the diagnostic apparatus diagnoses an abnormality in the traveling resistance of the door, based on the acquired data.

In the present embodiment, in a diagnostic system, at least one of opening or closing of a door of a train carriage is performed at a second speed that is lower than a first speed at which a passenger for the train carriage gets on and off. The diagnostic system is, for example, the above diagnostic system SYS. When a motor drives the door in at least one case of a case where the door is opened at the second speed, or a case where the door is closed at the second speed, the diagnostic system acquires data (drive data) for the motor configured to drive the door, the acquired data relating to the driving of the door. Then, the diagnostic system diagnoses an abnormality in a traveling resistance of the door, based on the acquired data.

An information processing apparatus may execute a diagnosis method. Specifically, in the diagnosis method, when a motor drives a door in at least one of a case where the door of a train carriage is opened at a second speed that is lower than a first speed at which a passenger gets on and off the train carriage, or a case where the door is closed at the second speed, the information processing apparatus acquires data (drive data) for the motor configured to drive the door, the acquired data being related to the driving of the door. Then, in the diagnosis method, the information processing apparatus diagnoses an abnormality in a traveling resistance of the door, based on the acquired data.

A program may be executed by an information processing apparatus. Specifically, when a motor drives a door in at least one case of a case where the door of a train carriage is opened at a second speed that is lower than a first speed at which a passenger gets on and off the train carriage, or a case where the door is closed at the second speed, the program causes the information processing apparatus to acquire data (drive data) for the motor that drives the door, the acquired data being related to the driving of the door. Then, the program causes the information processing apparatus to diagnose an abnormality in a traveling resistance of the door, based on the acquired data.

With this arrangement, when a door is opened or closed at a relatively low second speed, an operating section at which the door is in a steady state is relatively long, in comparison to a case where the door is opened or closed at a first speed at which a normal passenger gets on and off. This is because a time period required to accelerate the door at a time of starting operation and then decelerate the door at a time of stopping the operation can be relatively shortened, by lowering a speed range that is obtained in the steady state. Thus, when the door is at a position closer to a position at which a fully opened state or a fully closed state of the door is maintained, the diagnostic apparatus or the like can diagnose an abnormality in the traveling resistance of the door, based on drive data of the motor in an operating section in which the door is in the steady state. Therefore, the diagnostic apparatus or the like can more appropriately determine the abnormality in the resistance that is obtained during opening or closing of the door of the train carriage.

Further, in the present embodiment, the second speed may be a constant speed.

With this arrangement, a diagnostic apparatus or the like can use drive data for the motor that is driven at a constant speed. In this case, the diagnostic apparatus or the like can relatively easily and reliably determine (i) the presence or absence of an abnormality occurring in the drive data for the motor that is driven at the constant speed, (ii) an extent or the like to which the abnormality occurs in the drive data. Thus, the diagnostic apparatus or the like can more appropriately diagnose the abnormality in a traveling resistance of a door of a train carriage.

In the present embodiment, a diagnostic apparatus may compare the acquired data with reference data, the acquired data including at least one of (i) time series data that is acquired during a steady state period from starting to stopping opening of the door at the second speed, or (ii) time series data that is acquired during a steady state period from starting to stopping closing of the door at the second speed, and the reference data being time series data for the steady state period, to thereby diagnose the abnormality based on a result of comparison. A predetermined criterion includes, for example, the threshold Th1, Th2, or Th31 described above.

With this arrangement, the diagnostic apparatus can diagnose an abnormality in a traveling resistance of the door by comparing acquired data with reference data that is set in a normal state, for example.

In the present embodiment, a diagnostic apparatus may diagnose the abnormality upon occurrence of a condition in which a difference between the at least one time series data and the reference data is greater than a predetermined criterion.

With this arrangement, the diagnostic apparatus can diagnose that an abnormality in a traveling resistance of the door occurs, when, for example, determining that a relatively great difference between acquired data and reference data for a normal state is obtained.

In the present embodiment, a diagnostic apparatus may estimate a cause of an abnormality, based on an occurrence pattern of a state in which the difference is greater than a predetermined criterion.

With this arrangement, the diagnostic apparatus can estimate the cause of the abnormality, in addition to determining the presence or absence of the abnormality.

In the present embodiment, a diagnostic apparatus may estimate that a cause of an abnormality includes intrusion of foreign matter into a door rail or deformation in the door rail, upon occurrence of a condition in which the difference is greater than a predetermined criterion within a portion of a steady state period.

With this arrangement, the diagnostic apparatus can estimate a state in which the abnormality in a traveling resistance of the door occurs due to a shortage of grease or fouling at the door rail.

In the present embodiment, a diagnostic apparatus may estimate that a cause of an abnormality includes a change in a tilt state of a door, upon occurrence of a condition in which the difference is increased in accordance with movement of the door during a steady state period in which the door moves from a beginning to an end of an operating section, in conjunction with a condition in which the increased difference is greater than a predetermined criterion.

With this arrangement, the diagnostic apparatus can estimate a state in which the abnormality in the traveling resistance of the door occurs, based on changes in the tilt state of the door rail relative to a front-and-back direction.

In the present embodiment, a diagnostic apparatus may estimate that a cause of an abnormality includes intrusion of foreign matter into a door rail or deformation in the door rail, upon occurrence of a condition in which the difference is greater than a predetermined criterion within a portion of a steady state period.

With this arrangement, the diagnostic apparatus can estimate a state in which the abnormality in the traveling resistance of the door occurs due to intrusion of foreign matter into the door rail or deformation of the door rail.

In the present embodiment, acquired data may include pieces of data that are acquired in a case where at least one of opening or closing of a door is performed a plurality of times. A diagnostic apparatus may estimate that a cause of an abnormality includes deformation in a door rail, upon occurrence of a condition in which positions of a door, at each of which the difference is greater than a predetermined criterion, are concentrated in a predetermined narrow range, and may estimate that the cause of the abnormality includes intrusion of foreign matter into the door rail, upon occurrence of a condition in which the positions of the door, at each of which the difference is greater than the predetermined criterion, are dispersed in a predetermined wide range.

With this arrangement, the diagnostic apparatus can estimate a cause of an abnormality in the traveling resistance of the door, so as to distinguish between a state in which foreign matter is intruded into a door rail and a state in which deformation of the door rail occurs.

In the present embodiment, acquired data may include first time series data that is acquired during a first steady state period from starting to stopping opening of the door, and may include second time series data that is acquired during a second steady state period from starting to stopping opening of the door. A diagnostic apparatus may compare the first time series data with the second time series data to diagnose an abnormality.

With this arrangement, for example, the diagnostic apparatus can diagnose the abnormality occurring in the traveling resistance of the door during opening and closing of the door, when there is a difference between data acquired during the opening and data acquired during the closing of the door.

In the present embodiment, first time series data is acquired during a first steady state period in which a door moves in a first operating section, and second time series data is acquired during a second steady state period in which the door moves in a second operating section. A diagnostic apparatus may diagnose that the abnormality occurs due to a change in a tilt state of a door rail relative to a front-and-back direction, upon occurrence of a condition in which the difference between the first time series and the second time series is greater than a predetermined criterion, in conjunction with a condition in which the door in each of a first operating section and a second operating section is at a same position. The predetermined criterion is, for example, the threshold Th32 described above.

With this arrangement, the diagnostic apparatus can perform abnormality diagnosis with respect to whether the traveling resistance of the door that is obtained during opening and closing of the door occur due to changes in a tilt state of a door rail in a front-and-back direction.

Although the embodiments are described in detail above, the present disclosure is not limited to a specific embodiment, and various modifications and changes can be made within the scope of a gist described in the present disclosure.

In the embodiments described above, an abnormality in a traveling resistance of a door can be diagnosed more appropriately.

What is claimed is:

1. A diagnostic apparatus comprising:

circuitry configured to:

receive a request to perform diagnosis for a door in a train carriage, set, in response to receiving the request, a second speed lower than a first speed, the first speed being a speed at which the door opens and closes during a first operation mode, and the second speed being a speed at which the door opens and closes during a second operation mode, acquire data for a motor that drives the door at the second speed to cause the door to open or close, and diagnose an abnormality in a traveling resistance of the door, based on the acquired data for the motor that drives the door at the second speed, wherein the second operation mode is a diagnostic operation mode, and the first operation mode differs from the second operation mode.

2. The diagnostic apparatus according to claim 1, wherein the second speed is a constant speed.

3. The diagnostic apparatus according to claim 1, wherein the circuitry is configured to:

compare the acquired data with reference data, the acquired data including at least one of (i) time series data that is acquired during a steady state period from starting to stopping opening of the door at the second speed, or (ii) time series data that is acquired during a steady state period from starting to stopping closing of the door at the second speed, and the reference data being time series data for the steady state period, and diagnose the abnormality based on a result of comparison.

4. The diagnostic apparatus according to claim 3, wherein the circuitry is configured to diagnose the abnormality upon occurrence of a condition in which a difference between the at least one time series data and the reference data is greater than a predetermined criterion.

5. The diagnostic apparatus according to claim 4, wherein the circuitry is configured to estimate a cause of the abnormality, based on an occurrence pattern of a state in which the difference is greater than the predetermined criterion.

6. The diagnostic apparatus according to claim 5, wherein the circuitry is configured to estimate that the cause of the abnormality includes a shortage of grease, or fouling, at a door rail, upon occurrence of the condition in which the difference is greater than the predetermined criterion, over an entirety of the steady state period.

7. The diagnostic apparatus according to claim 5, wherein the circuitry is configured to estimate that the cause of the abnormality includes a change in a tilt state of the door, upon occurrence of a condition in which the difference is increased in accordance with movement of the door during the steady state period in which the door moves from a beginning to an end of an operating section, in conjunction with a condition in which the increased difference is greater than the predetermined criterion.

8. The diagnostic apparatus according to claim 5, wherein the circuitry is configured to estimate that the cause of the abnormality includes intrusion of foreign matter into a door rail or deformation in the door rail, upon occurrence of a condition in which the difference is greater than the predetermined criterion within a portion of the steady state period.

9. The diagnostic apparatus according to claim 8, wherein the acquired data includes pieces of data that are acquired in a case where at least one of opening or closing of the door is performed a plurality of times, wherein the circuitry is configured to:

estimate that the cause of the abnormality includes deformation in the door rail, upon occurrence of a condition in which positions of the door, at each of which the difference is greater than the predetermined criterion, are concentrated in a predetermined narrow range, and estimate that the cause of the abnormality includes the intrusion of the foreign matter into the door rail, upon occurrence of a condition in which the positions of the door, at each of which the difference is greater than the predetermined criterion, are dispersed in a predetermined wide range.

10. The diagnostic apparatus according to claim 1, wherein the acquired data includes first time series data that is acquired during a first steady state period from starting to stopping opening of the door, and second time series data that is acquired during a second steady state period from starting to stopping opening of the door, and wherein the circuitry is configured to compare the first time series data with the second time series data to diagnose the abnormality.

11. The diagnostic apparatus according to claim 10, wherein the first time series data is acquired during the first steady state period in which the door moves in a first operating section, and the second time series data is acquired during the second steady state period in which the door moves in a second operating section, wherein the circuitry is configured to diagnose that the abnormality occurs due to a change in a tilt state of a door rail relative to a front-and-back direction, upon occurrence of a condition in which the difference between the first time series data and the second time series data is greater than the predetermined criterion, in conjunction with a condition in which the door in each of the first operating section and the second operating section is at a same position.

12. A diagnostic system comprising:

circuitry configured to:

drive a door in a train carriage at a second speed to cause the door to open or close, the second speed at which the door opens and closes during a first operation mode being lower than a first speed at which the door opens and closes during a second operation mode, acquire data for a motor that drives the door at the second door to cause the door to open or close, and diagnose an abnormality in a traveling resistance of the door, based on the acquired data for the motor that drives the door at the second speed, wherein the second operation mode is a diagnostic operation mode, and the first operation mode differs from the second operation mode.

13. A diagnostic method executed by an information processing apparatus, the diagnostic method comprising:

receiving a request to perform diagnosis for a door in a train carriage;

setting, in response to receiving the request, a second speed lower than a first speed, the first speed being a speed at which the door opens and closes during a first operation mode, and the second speed being a speed at which the door opens and closes during a second operation mode;

acquiring data for a motor that drives the door at the second speed to cause the door to open or close; and diagnosing an abnormality in a traveling resistance of the door, based on the acquired data for the motor that drives the door at the second speed, wherein the second operation mode is a diagnostic operation mode, and the first operation mode differs from the second operation mode.

14. A non-transitory computer readable medium storing a program for causing a computer to execute the diagnostic method of claim 13.

* * * * *